United States Patent [19]
Lubin et al.

[11] Patent Number: 5,395,243
[45] Date of Patent: Mar. 7, 1995

[54] INTERACTIVE LEARNING SYSTEM

[75] Inventors: David A. Lubin, Watertown; Tyrone C. Mowatt, North Andover; Andrew Brenneman, Arlington, all of Mass.

[73] Assignee: National Education Training Group, Reno, Nev.

[21] Appl. No.: 263,016

[22] Filed: Jun. 20, 1994

Related U.S. Application Data

[63] Continuation of Ser. No. 765,563, Sep. 25, 1991, abandoned.

[51] Int. Cl.$^6$ .............................. G09B 19/00
[52] U.S. Cl. .................. 434/118; 434/307 R; 434/323; 395/154; 395/927; 345/119
[58] Field of Search ............ 434/118, 169, 307 R, 434/308, 318, 322, 323, 350, 365; 395/10, 100, 154, 155, 160, 927; 364/419.01, 419.20; 345/118, 119, 120

[56] References Cited

U.S. PATENT DOCUMENTS

| | | | |
|---|---|---|---|
| 4,541,056 | 9/1985 | Matthews | 434/118 |
| 4,622,013 | 11/1986 | Cerchio | 434/118 |
| 4,637,797 | 1/1987 | Whitney et al. | 434/118 |
| 4,671,772 | 6/1987 | Slade et al. | 434/350 X |
| 4,772,206 | 9/1988 | Kerr et al. | 434/118 |
| 4,798,543 | 1/1989 | Spiece | 434/323 |
| 4,945,476 | 7/1990 | Bodick et al. | 364/413.02 |
| 4,965,741 | 10/1990 | Winchell et al. | 364/488 X |
| 5,002,491 | 3/1991 | Abrahamson et al. | 434/323 X |
| 5,109,482 | 4/1992 | Bohrman | 395/154 |
| 5,120,230 | 6/1992 | Clark et al. | 434/307 |
| 5,179,658 | 1/1993 | Izawa et al. | 395/164 |

Primary Examiner—Richard J. Apley
Assistant Examiner—Joe H. Cheng
Attorney, Agent, or Firm—Dressler, Goldsmith, Shore & Milnamow, Ltd.

[57] ABSTRACT

An interactive learning system used for learning an application program, such as a word processing program, provides three basic types of instruction including interactive audiovisual lessons, reference information, and practice in using the actual application program being learned. The reference information may include relatively detailed reference information, relatively brief reference information, and customized reference information generated via an electronic clipboard. The subject matter of the application program is subdivided into different subject matter areas or units, and the user of the system may select to receive lessons relating to any of the units. The interactive learning system provides three learning paths, one of which comprises completing all of the lessons in a unit and then using the features of the actual application program relating to the unit that was just completed to reinforce the instruction received by the user.

1 Claim, 18 Drawing Sheets

Fig. 9

INTERACTIVE LEARNING SYSTEM

This is a continuation of U.S. application Ser. No. 07/765,563, filed on Sep. 25, 1991, now abandoned.

BACKGROUND OF THE INVENTION

The present invention relates to a computer-driven interactive learning system for use in learning a computer program for an application, such as a word processing, in which a number of different modes of learning are accessible to the user of the system.

Many computer programs exist for performing often used functions such as word processing, financial spreadsheeting, and database functions. Such computer programs are referred to herein as application programs. Examples of application programs in widespread use are LOTUS 1-2-3 and WORDPERFECT. "Application program" as used herein also includes an operating system program such as the DOS where a user is learning to use the operating system program.

The training of personnel in the use of application programs may be performed by various methods. Such training may be accomplished via a traditional approach in which students are taught by a teacher with written reference materials, such as a user's manual for the application program. In addition, each student may be provided with a computer for executing the application program being learned so that the instruction is augmented by hands-on experience. This traditional type of instruction has disadvantages such as the relatively infrequent scheduling of classes and limited availability of personal instruction due to class size.

One alternative to the traditional approach to learning application programs is the use of computer-driven interactive learning systems which can be used by a single student. One such interactive learning system is described in U.S. Pat. No. 4,637,797 to Whitney, et al. That patent describes a computer-driven software training system in which a computer is coupled to a cassette tape player system. The training system operates by selectively activating the cassette player to provide oral instruction to the student, and by analyzing the student's keystrokes input while the computer program being taught is running. If the student makes the correct keystrokes, the tape player is turned on and the oral lesson continues. If an incorrect entry is made, the learning system enters the correct entry and proceeds with the next portion of the training lesson.

Another computer-driven interactive learning system is described in U.S. Pat. No. 4,622,013 to Cerchio. That patent describes an interactive software training system which trains a student to use an application program. The training system works by interpreting the data entered by the student for the application program. That interpretation allows the training system to determine if the student requires additional instruction before proceeding with the next portion of the application program instruction.

SUMMARY OF THE INVENTION

The present invention is an interactive learning system and method for use in learning an application program, such as a word processing program, that provides different modes of learning to a user and gives the user great flexibility in using the various learning modes. The learning modes may include interactive audiovisual lessons that simulate the operation of the actual program, a reference mode in which the user may access textual reference information about various subject matter areas of the application program, and an application mode in which the user runs that actual application program being learned.

The interactive learning system in accordance with the present invention also provides a method of learning an application program in which three different learning paths may be utilized. One of the learning paths is a lesson path during which the user works through a sequence of audiovisual lessons relating to various features of the application program being learned, and then upon completion of the lesson sequence, uses the actual application program to reinforce the audiovisual instruction provided by the system. In a second learning path, the user may select a topic relating to a feature of the application program being learned and then receive either audiovisual lessons or electronic textual reference information regarding the selected topic. In a third learning path, the user may run the application program without initially receiving any system training, but may access electronic textual reference information relating to the application program, while the application program is running, without the need to exit the application program.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
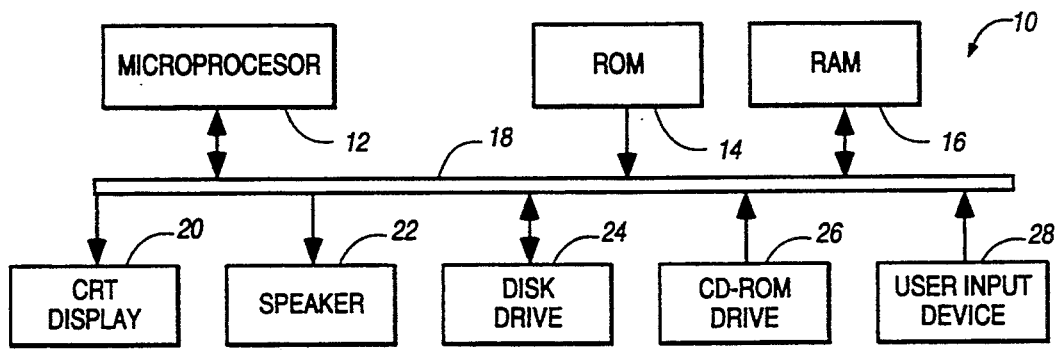
FIG. 1 is a block diagram of the electronics of a preferred embodiment of an interactive learning system in accordance with the present invention.

A preferred embodiment of an interactive learning system 10 in accordance with the invention is shown in FIG. 1. The system 10 includes a microprocessor 12 connected to a read-only memory (ROM) 14 and a random-access memory (RAM) 16 via a bus 18. A computer program that controls the operation of the interactive learning system 10 is stored in the ROM 14 and executed by the microprocessor 12.

A number of input/output (I/O) devices are connected to the microprocessor 12 via the bus 18. These I/O devices include a display device such as a CRT 20, an audio generator such as a speaker 22, a disk drive 24, a compact-disk (CD) ROM drive 26 and a user input device 28 such as a keyboard or an electronic mouse.

During operation of the system, visual information and lessons are generated on the CRT 20 from the CD-ROM drive 26. At the same time, audio instruction is provided to the user via the speaker 22. In addition to the audiovisual lessons, textual reference information about the application program being learned may be provided on the CRT 20.

When used by a hearing-impaired user, or in an environment in which individual speakers are not available, such as a local-area network (LAN), the learning system 10 may be provided with means for generating text on the display 20 that substantially corresponds to the audio that would be generated by the speaker 22. In this case, the text corresponding to the entire audio soundtrack for each lesson is stored in a portion of memory. Instead of periodically activating the speaker 22 to generate audio instruction for the user, the learning system 10 periodically accesses the memory portion in which the text corresponding to the audio soundtrack is stored, and displays sequential portions of the text on the CRT 20 as a lesson progresses. The visual text corresponding to the portion of the audio soundtrack may be provided in a predetermined area of the CRT 20, such as in a window separated from the text relating to the visual portion of the lesson. The generation of visual text corresponding to the audio soundtrack may also be performed in other ways.

The interactive learning system 10 of the invention may be utilized in connection with a conventional personal computer or any other type of computer system. The manner in which the computer program of the preferred embodiment and the application program being learning or used are stored in memory is not critical to the invention. The two programs could be stored in different portions of one memory or in two separate memories.

Overview of Operation

The interactive learning system allows a user to utilize three different types of instruction: 1) interactive audiovisual instruction, 2) textual reference information; and 3) instruction by using the actual application program being taught.

The interactive audiovisual instruction includes two sub-categories of instruction. The user can receive audiovisual instruction based upon either predesigned sequences of audiovisual lesson segments or audiovisual lesson segments tailored to very specific points of instruction.

The textual reference information has three subcategories: 1) a "quick reference" sub-category which provides relatively brief textual explanation of various aspects of the application program being taught; 2) a "desk reference" sub-category which provides detailed textual explanation of various aspects of the application program; and 3) "clipboard information" which is custom-generated by the user.

Figure 2:
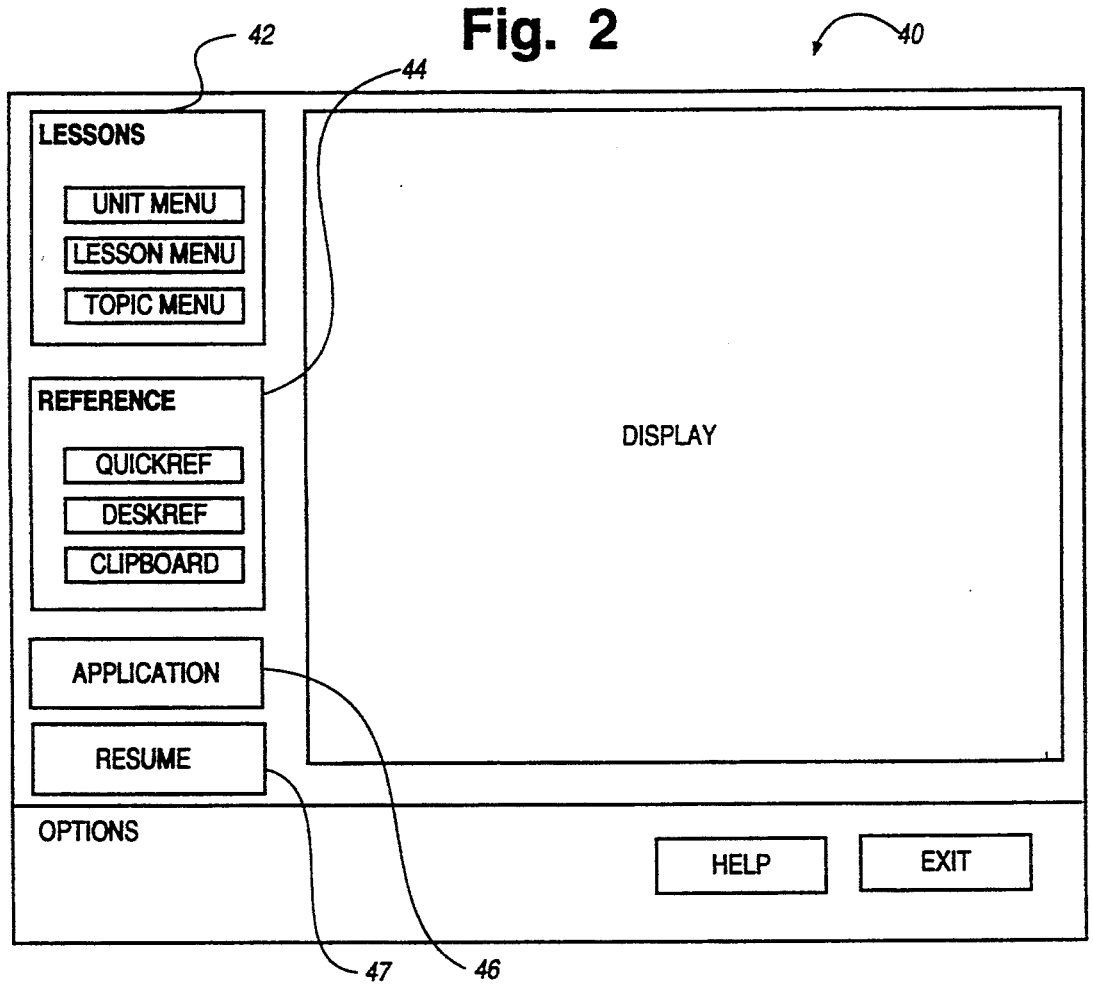
FIG. 2 is an illustration of an options display generated during the operation of the learning system.

These six categories of instruction, or modes of learning, can be accessed by the user a number of ways, one of which is an options display 40 generated by the system during operation. Referring to FIG. 2, the options display 40 includes a lessons window 42 at its upper left portion, a reference window 44 at its middle left portion, and an Application key 46 and a Resume key 47 at its lower left portion.

The Unit Menu and Lesson Menu Keys

The lessons window 42 includes two sub-windows or keys that can be selected by the user in order to receive interactive audiovisual lessons: a Unit Menu key and a Lesson Menu key. These keys may be selected via an electronic mouse or by enclosing them in a highlight box and hitting the Enter key of the keyboard.

The subject matter of the application program being taught is broken down into relatively broad information categories, or units. Each unit is further subdivided into a number of lessons. In order to receive interactive audiovisual instruction, the user may select a particular unit and one of the lessons within that unit. The number of units and the number of lessons in each unit is not important, nor is the particular manner in which the application program is divided into units and lessons.

Figure 3A:
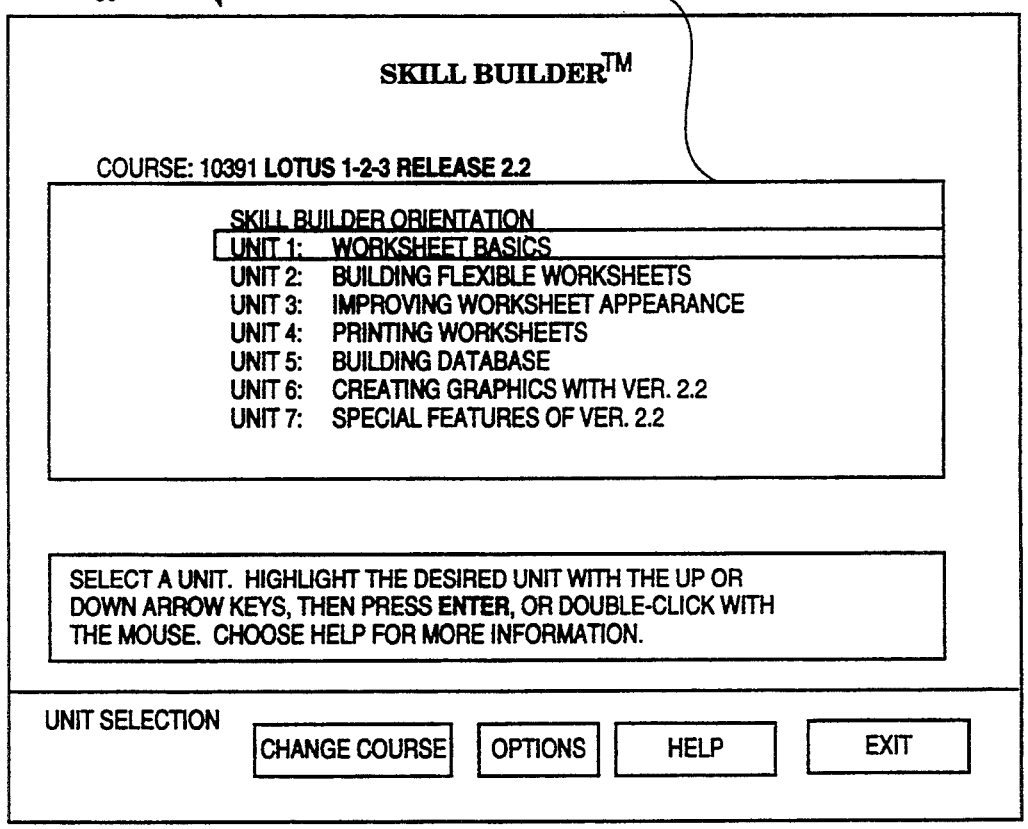
FIG. 3a is an illustration of a unit selection display generated during operation of the system.

A unit is selected by the user by activating the Unit Menu key in the lesson window 42. In response, the system 10 generates a unit selection display 50, which is shown in FIG. 3a. The unit selection display 50 contains eight relatively broad categories, or units, on which audiovisual instruction can be received with respect to Version 2.2 of LOTUS 1-2-3. These categories include: 1) SKILL BUILDER ® orientation, which is an orientation to the interactive learning system of the present invention; 2) Unit 1: Worksheet Basics; 3) Unit 2: Building Flexible Worksheets; etc.

Figure 3B:
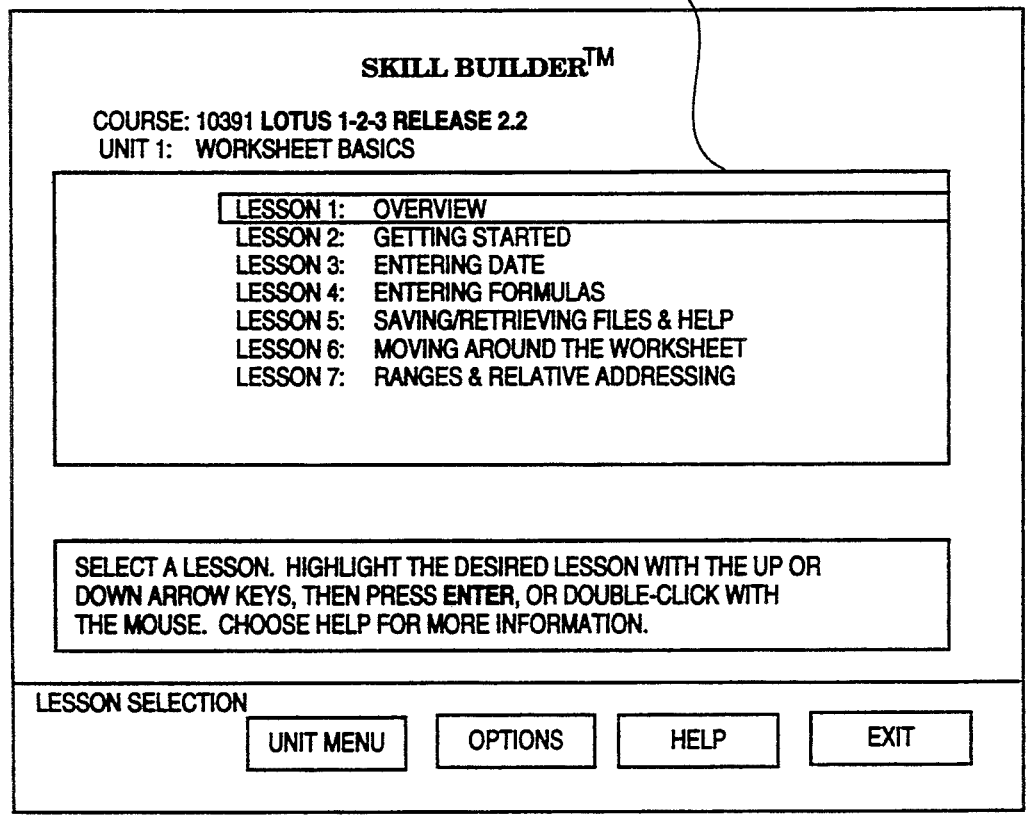
FIG. 3b is an illustration of a lesson selection display generated during operation of the system.

When the user selects one of the eight units of the unit selection display 50, the system 10 generates a lesson selection display 54 shown in FIG. 3b, which contains seven lessons for Unit 1: Worksheet Basics. It should be appreciated that there is a unique lesson selection display like the one shown in FIG. 3b for each unit shown in the unit selection display 50 of FIG. 3a. When the user selects one of the lessons shown in the lesson selection display 54, a series of audiovisual lesson segments is initiated on the subject matter described by the selected lesson.

The Topic Menu Key

Instead of receiving audiovisual lessons by selecting particular units and lessons, the user may instead choose to receive audiovisual instruction or textual instruction based upon a particular topic. Referring to FIG. 2, this course of action is chosen by selecting the Topic Menu key in the lesson window 42. As a result of this selection, the system generates a topic index display 58 shown in FIG. 4a.

The topic index display 58 has a relatively large window 60 which lists the various topics relating to the application program upon which audiovisual lessons can be received. The subject matter areas of the topics may be made relatively narrow so that the lessons are short and specifically tailored to the specific topic. As a result, the use of the topic index to receive audiovisual instruction is advantageous in that specific instruction can be received without the necessity of going through an entire lesson.

Figure 4A:
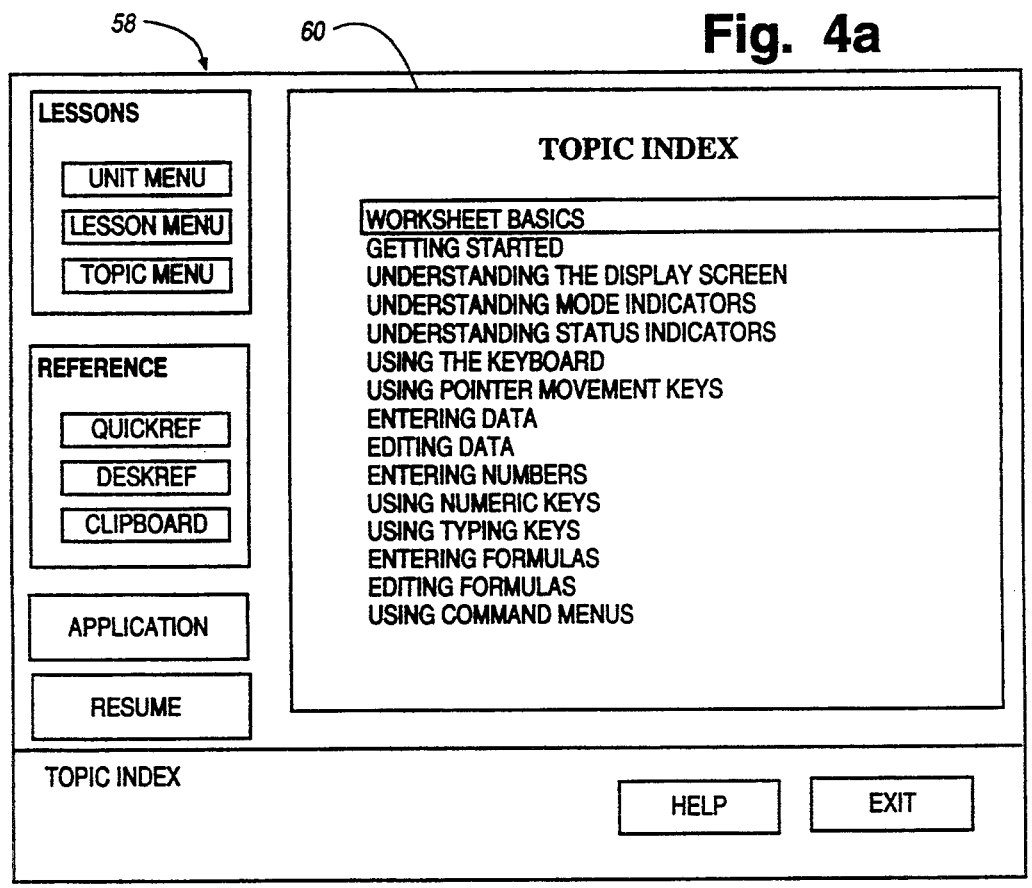
FIG. 4a is an illustration of a topic index display generated during operation of the system.
Figure 4B:
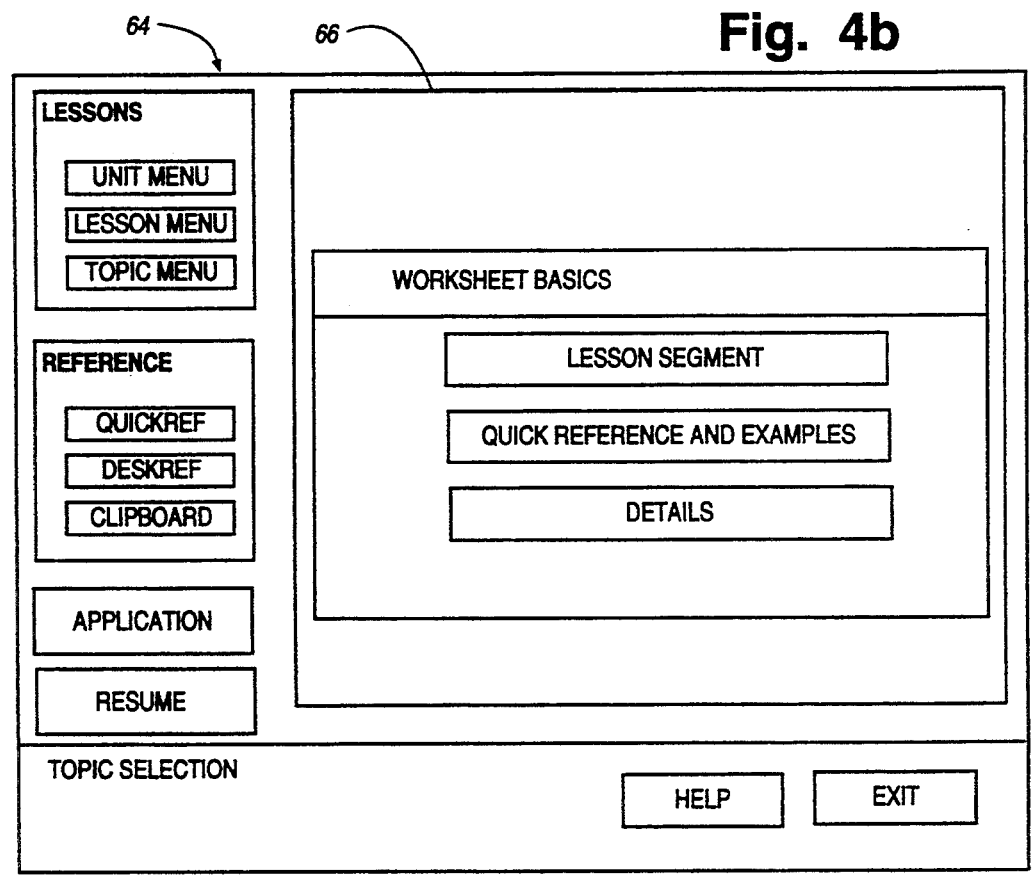
FIG. 4b is an illustration of a topic selection display generated during operation of the system.

Upon selection of one of the topics shown in the topic index window 58 of FIG. 4a, the system generates a topic selection display 64 shown in FIG. 4b, which prompts the user to select the type of instruction to be given on the selected topic.

The user may receive three types of instruction. To receive interactive audiovisual instruction, the user should select the Lesson Segment key in the main window 66 of the display 64. To receive relatively brief textual instruction and examples, the user would select the Quick Reference and Examples key in the main window 66. To receive detailed textual instruction, the user would select the Details key in the main window 66.

The QuickRef Key

Referring back to FIG. 2, the user can receive relatively brief textual reference information by selecting a QuickRef key in the reference window 44. If the user selects this key, the system generates a quick reference index display 70, like the one shown in FIG. 5a, that includes in a main window 72 an index of topics relating to the application program for which relatively brief reference information can be obtained. Upon selection of one of the topics in the main window 72, the system generates a quick reference item display 74, shown in FIG. 5b, that contains in a main window 76 relatively brief textual information about the topic selected from the index.

The DeskRef Key

Referring back to FIG. 2, in order to obtain detailed textual reference information about a topic, the user may select the DeskRef key in the reference window 44. Upon that selection, the system 10 generates a desk reference index display 80, like the one shown in FIG. 6a, that contains in a main window 82 an index of topics for which relatively detailed textual reference information about the application program can be obtained. Upon selecting one of the topics in the main window 82, the system generates a desk reference item display 86, shown in FIG. 6b, that contains in a main window 88 relatively detailed textual information about the selected topic. If the reference information exceeds one CRT display, the information may be scrolled up and down by the user.

The Clipboard Key

Referring back to FIG. 2, a third option available when using the reference window 44 is the Clipboard key. Selecting that key activates an electronic clipboard, or memory, the contents of which may be custom-generated by the user and stored on a diskette as explained in more detail below.

Figure 7A:
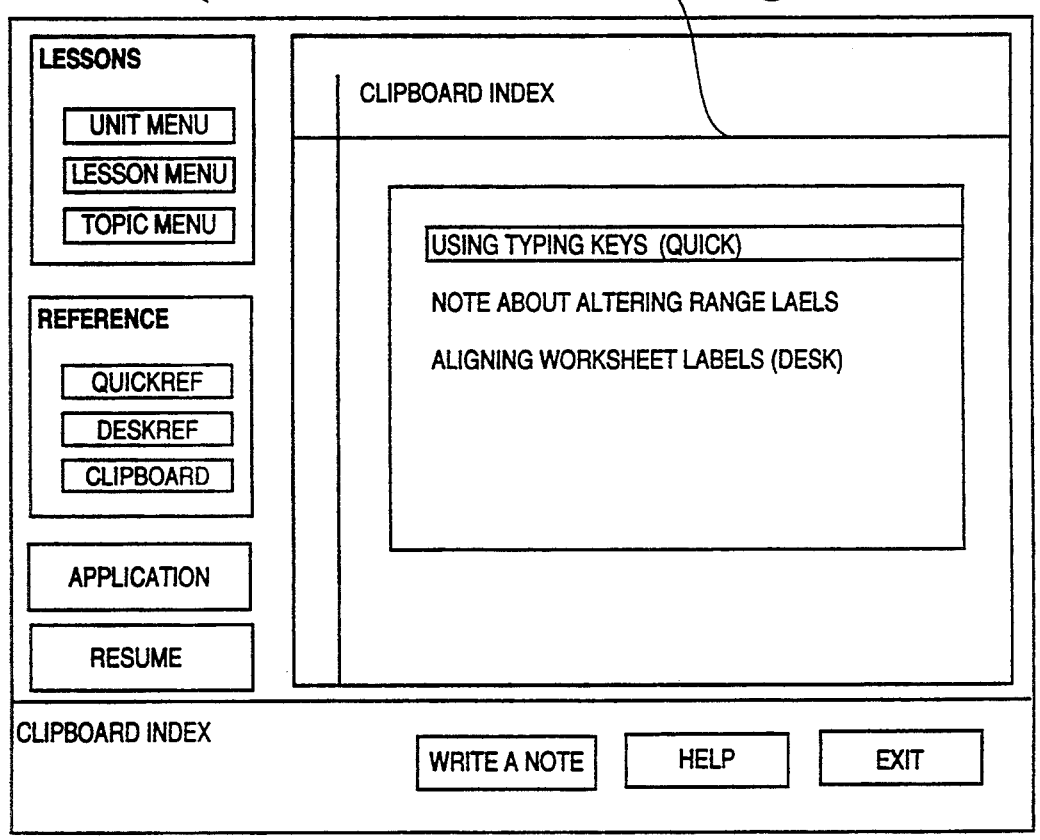
FIG. 7a is an illustration of a clipboard index display generated during operation of the system.

When the clipboard is selected, the system generates a clipboard index display 90 as shown in FIG. 7a. The display 90 contains in a main window 92 a listing of the titles of all items of information that have been stored in the electronic clipboard. When the user selects a title from the index display 90, the system generates a clipboard item display 96, shown in FIG. 7b, which contains in a main window 98 the textual contents of the selected title.

The Clipboard key may also be used to write notes generated by the user and save those notes to the clipboard diskette. Writing notes to the clipboard is accomplished via a clipboard create display 110 shown in FIG. 7c and described in more detail below.

The clipboard feature also allows the user to "clip" or store any of the reference information available on the interactive learning system, such as the reference information available via the QuickRef and DeskRef keys described above, to the clipboard diskette.

After the clipboard diskette is generated by the user, he or she may use that diskette in any other computer where the application program is available so that the user may access the information on the clipboard during subsequent use of the application program. This feature is particularly advantageous where users access the interactive learning system in a central training center and subsequently use the application program in their own offices.

The Application Key

An Application key 46 is provided towards the bottom left-hand portion of the options display 40 of FIG. 2. The purpose of the Application key 46 is to allow the user to use the actual application program being learned. As described in more detail below, the selection of the Application key 46 results in different actions, depending upon when the user selected it.

For example, if the user selects the Application key 46 without first conducting any lessons, the application program will be automatically run without the need for the user to manually terminate the operation of the interactive learning program.

Alternatively, if the user selects the Application key 46 upon completion of the lessons contained in one of the units of the interactive learning program, the application program will be automatically loaded and run, and an electronic file relating to the subject matter of the lessons just completed will be loaded into the application program. Thus, after completing a unit of lessons for a particular subject matter, the user may reinforce his or her learning by using the application program in a manner relating to that subject matter for which instruction was just received.

The Resume Key

The Resume key 47 is provided at the bottom left-hand portion of the options display 40 of FIG. 2. The purpose of the Resume key is to allow the user to temporarily interrupt a lesson in progress to access reference information and then to return to the exact point where the lesson was interrupted.

For example, if a user were conducting a lesson and wanted to obtain detailed reference information about a particular topic, the user could select the Topic Menu key in the lessons window 42 to access the reference information, and then return to the exact point where the lesson was interrupted by selecting the Resume key 47.

The lessons window 42, the reference window 44, the Application key 46 and the Resume key 47 are provided on many of the displays that are generated during the operation of the interactive learning system. As a result, the user may select any of these keys at any point in the program, thus giving the user tremendous flexibility in using the system to his or her own maximum benefit.

Overview Of Methods Of Learning

The interactive learning system of the present invention offers users three different learning paths to allow maximum flexibility of the system to meet the varying user needs. These three different learning paths include a lesson path, a topic path, and a work support path, which are shown in FIG. 9.

The lesson path may be advantageously selected by users who have never used the application program or who have little knowledge about its operation. The lesson path provides a sequence of specially designed interactive audiovisual lessons for each subject matter area or unit into which the application program is divided.

Figure 9:
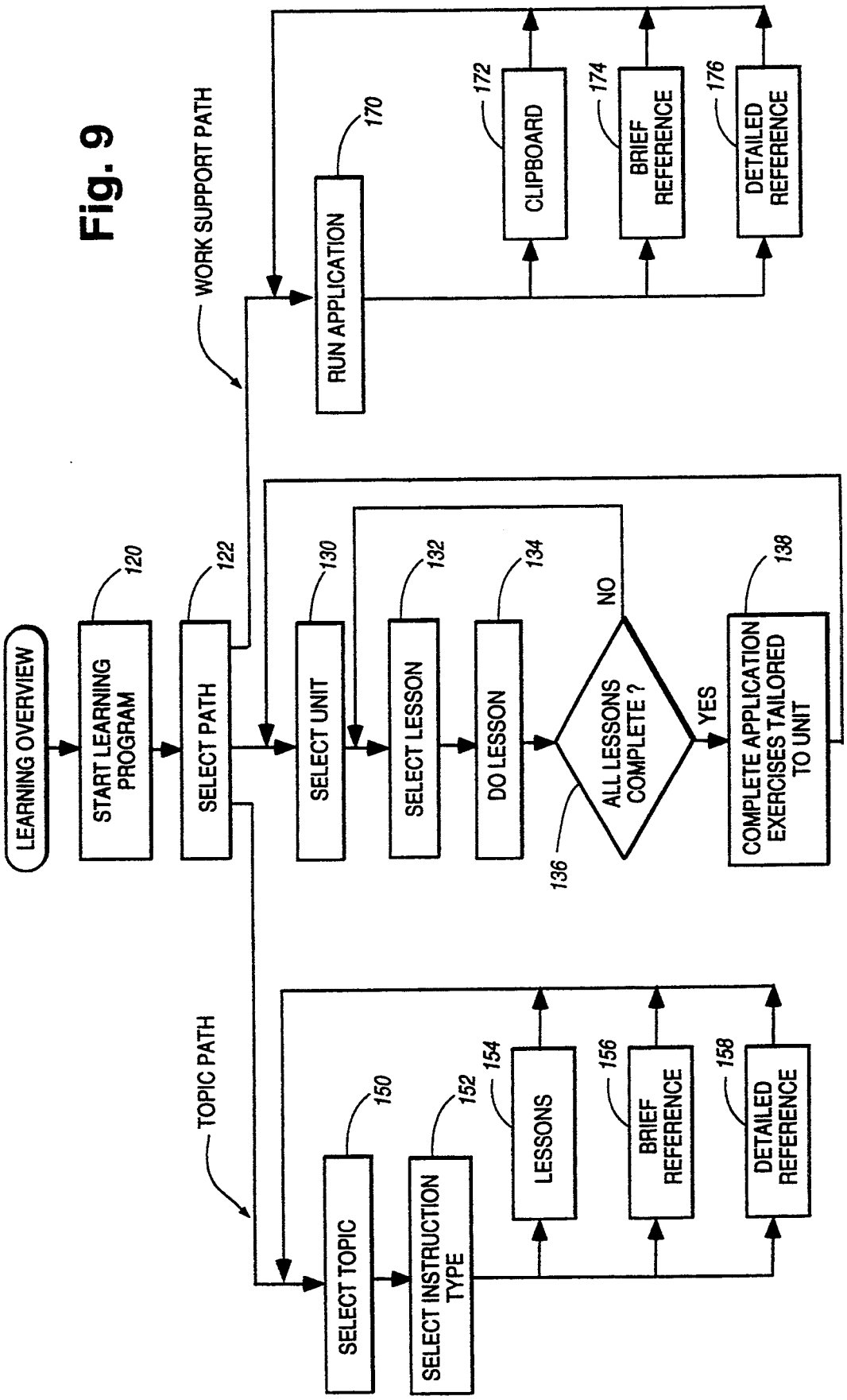
FIG. 9 is an overview of the methods of learning available in accordance with the present invention.

Referring to FIG. 9, after the learning program is started at step 120, the user is given a visual prompt on the CRT 20 at step 122 to select one of the three learning paths available on the system. If the user selects the lesson path, at step 130 the system generates the unit selection display 50, shown in FIG. 3a and described above, to allow the user to select a desired unit.

After the unit is selected, at step 132 the system generates the lesson selection display 54 of FIG. 3b to allow the user to select a desired lesson. After the user completes the lesson at step 134, he or she selects another lesson from the unit until all the lessons in the unit are completed. If all the lessons are completed at step 136, the user transfers to the actual application program at step 138 to perform exercises relating directly to the unit for which all lessons were completed, thus reinforcing the instruction the user just received during the lesson session.

Instead of the lesson path, the user may select the topic path, which is shown in the left-hand portion of FIG. 9. As described above, information about the application program is divided into various subject matter areas, or topics, about which the user can obtain information or receive lessons. The topic path may be used to quickly obtain information and instruction about specific areas of the application program, without the need for going through an entire sequence of lessons.

If the topic path is selected, the user first selects a topic at step 150 via the topic index display 58 shown in FIG. 4a and described above. At step 154, the user then selects the type of information or instruction he or she wishes to receive. This selection is accomplished via the topic selection display 64 of FIG. 4b. Depending on the user's request, the user receives lessons specifically tailored to the selected topic at step 154, or relatively brief textual reference information at step 156, or detailed reference information at step 158.

The third learning path available to the user, the work support path, is shown in the right-hand portion of FIG. 9. This path initially bypasses all lessons and reference information and allows the user to run the application program at step 170. However, at any point in the application program, and without exiting the application program, the user may retrieve and display on the CRT 20 customized, previously generated clipboard information at step 172, or brief reference information at step 174, or detailed reference information at step 176. The work support path may be advantageous to users who already have some working knowledge of the application program, or who have already completed the lesson path or the topic path, or who are simply more adventurous.

Detailed Operation

Figure 10:
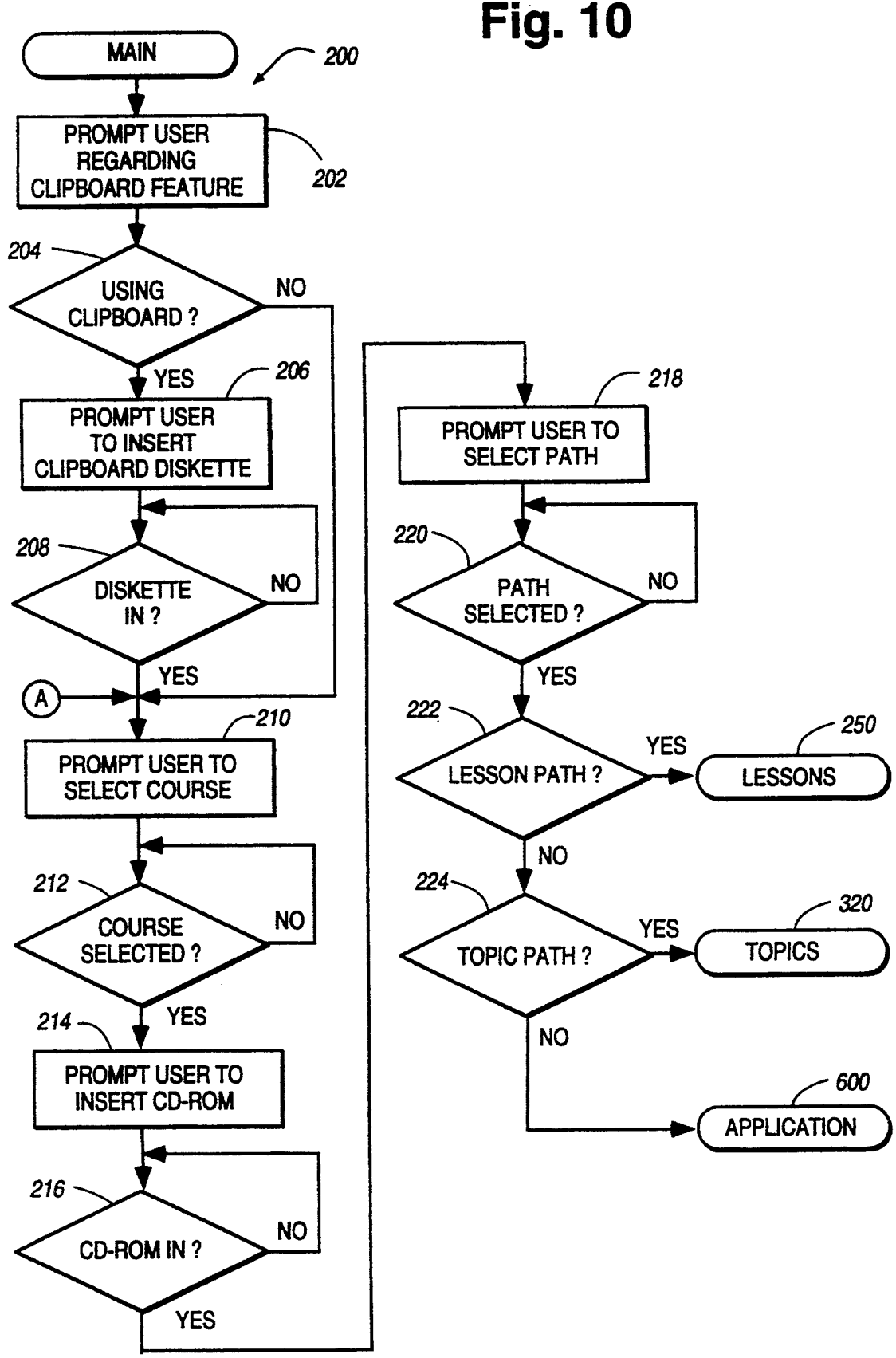
FIGS. 10–18 are flowcharts of a computer program that controls the operation of the learning system.

The operation of the interactive learning system is controlled by a computer program 200 executed by the microprocessor 12. A flowchart of the computer program 200 is illustrated in FIGS. 10–18. Referring to FIG. 10, at step 202 when the operation begins, the user is given a visual prompt on the CRT 20 asking whether the user will be using the clipboard feature. If the user intends to use the clipboard feature, a diskette must be inserted into the disk drive 24 so that system can store items on the diskette and retrieve information from the diskette. At step 204, if the user responds that the clipboard feature will be used, the program branches to step 206 where the user is given a visual prompt to insert the clipboard diskette into the disk drive 24.

When the diskette has been inserted as determined at step 208, the program generates a visual prompt on the CRT 20 to ask the user which application program, or course, the user wishes to use. The interactive learning system 10 is capable of providing instruction with respect to a number of application programs. After the user selects the desired course at step 212, the program generates another visual prompt to the user at step 214 requesting that the user insert the CD-ROM corresponding to the selected course into the CD-ROM drive 26.

At step 218, the program prompts the user to select the path the user wishes to use in receiving instruction for the selected application program. As described above, one of three learning paths may be chosen: the lesson path, the topic path and the work support path. The path selected at step 220 determines what type of instruction the user will receive during the initial portion of the training session. As described in more detail below, the user is given great flexibility in selecting which type of instruction to receive at any given time, and thus the path initially chosen may easily be changed.

At step 222, if the lesson path is chosen, the program branches to a portion 250 of the program, or routine, referred to herein as LESSONS. At step 224, if the topic path was chosen, the program branches to a routine referred to herein as TOPICS. If the selected path was neither the lesson nor the topic path, the work support path was selected, in which case the program branches to an APPLICATION routine.

LESSONS

Figure 11:
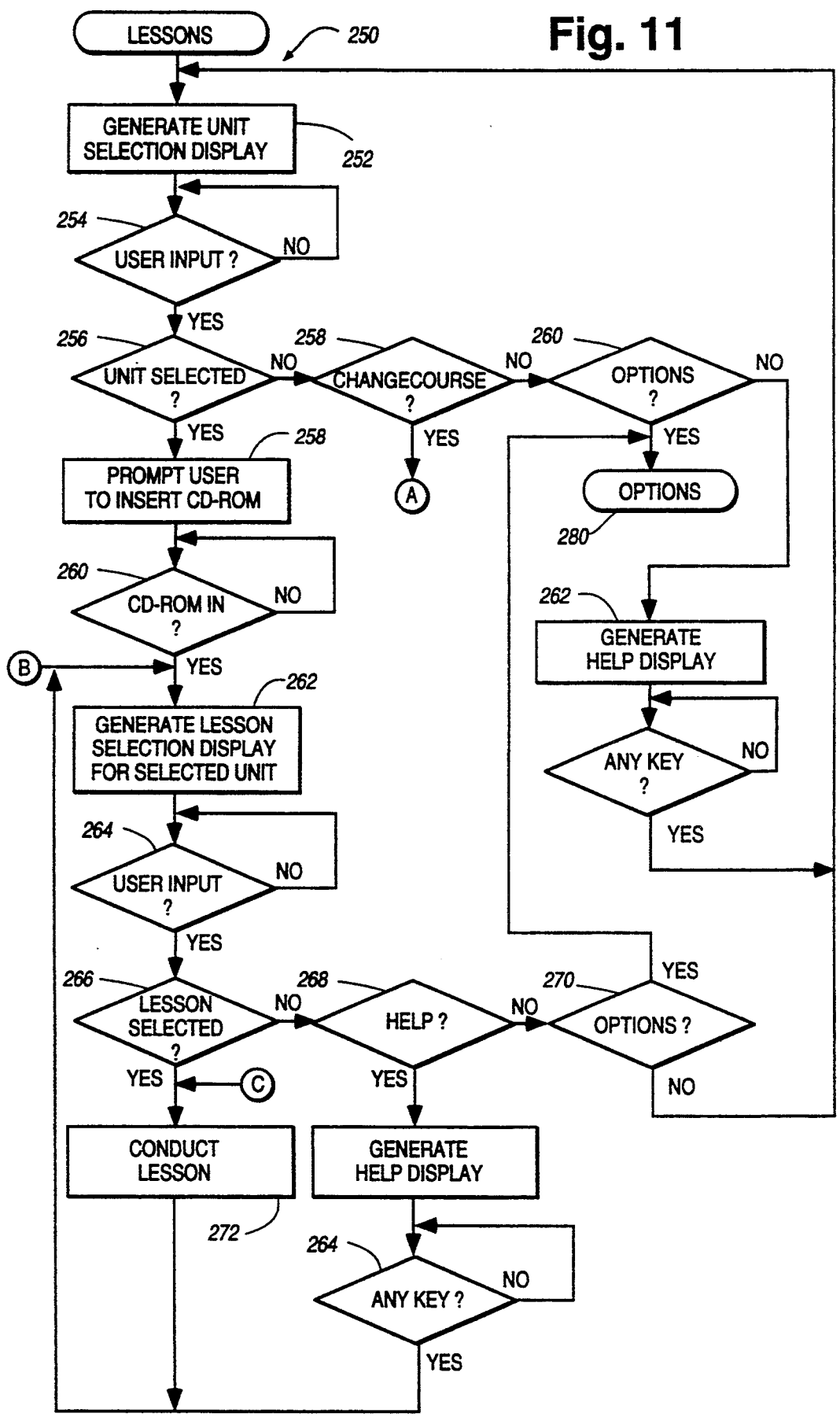

The operation of the LESSONS routine 250 is described in connection with FIG. 11. When LESSONS begins execution at step 252, the program generates a unit selection display on the CRT 20 like the display 50 shown in FIG. 3a and described above. After generating this display, the program waits for the user to make a selection.

Referring to FIG. 3a, the possible selections are shown. The user may select any of the eight units generally described in the main window 52. Alternatively, the user may select one of four keys shown towards the bottom of the display 50, which are the Change Course, Options, Help and Exit keys. The actions resulting from any of the above selections is now described in connection with FIG. 11.

If the user has not selected a unit as determined at step 256, the program branches to step 258, where it determines whether the user has decided to learn another application program (or change course). If so, the program branches back to step 210 in FIG. 10, where it will again prompt the user for the desired course.

If the user has selected the Options key as determined at step 260, the program branches to another portion of the program referred to herein as OPTIONS, which as described below, generates the options display 40 shown in FIG. 2 and gives the user all of the options provided in that display.

For purposes of simplifying the flowcharts shown herein, the Exit key, although available to the user on most of the displays generated by the system, is not represented in the flowcharts since it merely results in the termination of the operation of the system. Similarly, although the Help key is likewise available on the displays, it is only described in the flowchart shown in FIG. 11.

If the user did not select the Options key as determined at step 260 (and did not select the Exit key which is not treated in FIG. 11), the only remaining selection is the Help selection, in which case the program branches to step 262 where it generates help information in a conventional manner before branching back to the beginning of the LESSONS routine.

If the user selected a particular unit as determined at step 256, the program branches to step 258 where the program prompts the user to insert the CD-ROM corresponding to the unit selected. After the CD-ROM is inserted at step 260, the program generates at step 262 a lesson selection display on the CRT 20 like the display 54 shown in FIG. 3b. The lesson selection display contains all of the lessons available for the particular unit that the user selected at step 256.

At this point the user may select one of the lessons shown in the main window 56 of the display 54, or alternatively, the user may select one of four keys shown at the bottom of the display 54: a Unit Menu key, an Options key, a Help key and an Exit key.

If the user selected the Help key as determined at step 268, the program generates a help display and returns to step 262 where the lesson selection display is regenerated. If the user selected the Options key as determined at step 270, the program branches to the OPTIONS routine 280 which generates the options display 40 (FIG. 2).

If the user selected the Unit Menu key, the program will branch to step 252 from step 270 where the unit selection display 50 like the one of FIG. 3a will again be generated. This will give the user the opportunity to select a different unit without having to go through a lesson.

If the user selected a particular lesson as determined at step 266, the program will branch to step 272 where the selected lesson will be conducted. The lesson is conducted interactively by generating displays on the CRT 20 that simulates the actual application program, providing accompanying audio instruction in timed relationship with the video displays, and quizzing the user on the proper commands and use of the application program.

Each lesson consists of a number of lesson segments. The user may be provided the capability to select the next lesson segment without completing the current lesson segment, and may be allowed to go to previous lesson segments. The user also may be allowed to pause the lesson or to terminate the lesson while the lesson is being given. The use of interactive audiovisual lessons is preferred, although other types of lessons may be utilized.

After the selected lesson is conducted at step 272, the program branches back to step 262 where the lesson selection display is generated, thus allowing the user the opportunity to select another lesson.

OPTIONS

Figure 12:
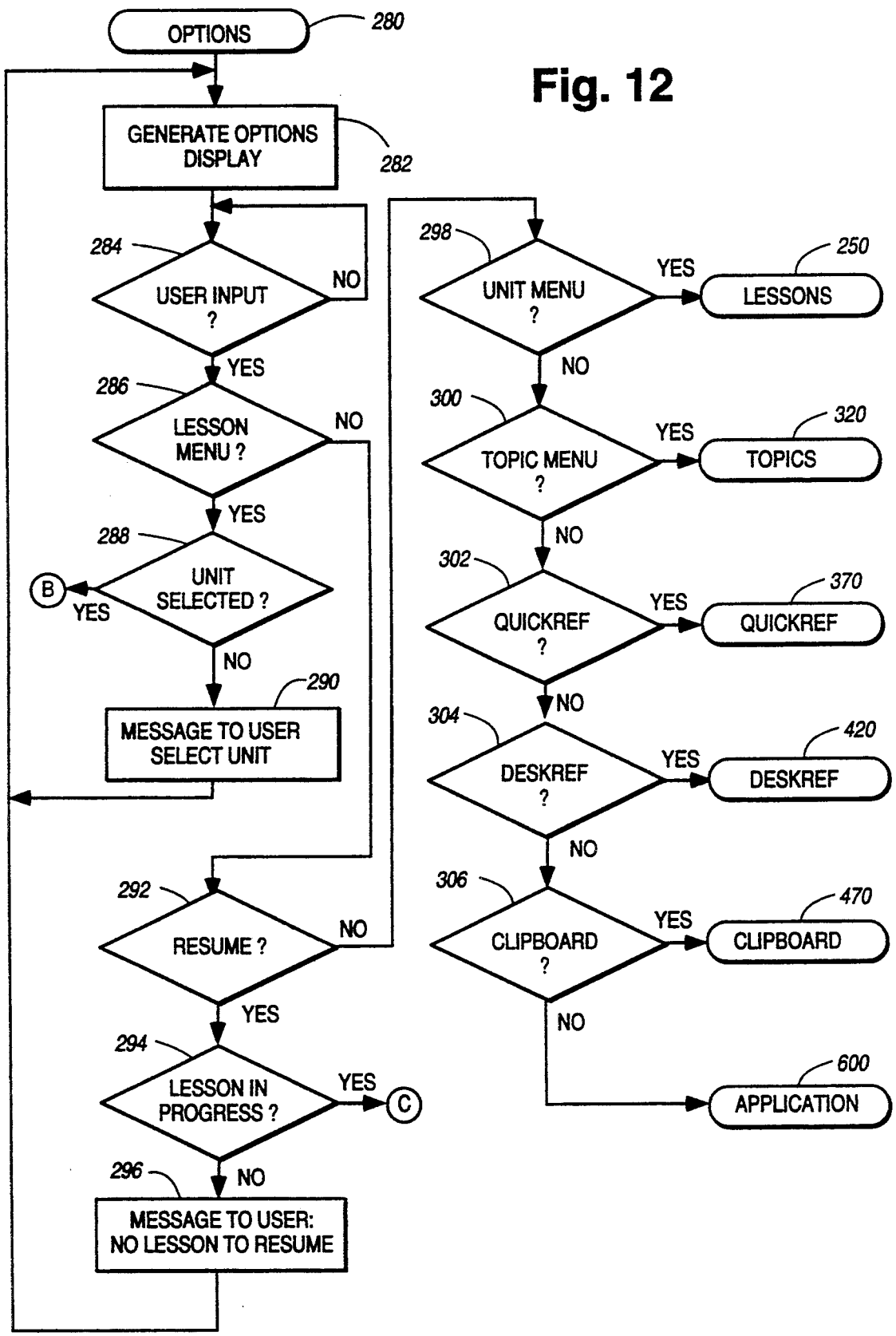

The operation of the OPTIONS routine 280, which is described below in connection with FIG. 12, generates the options display 40 shown in FIG. 2 to give the user all of the options described in connection therewith. When OPTIONS begins execution at step 282, the program generates the options display 40 shown in FIG. 2. This display 40 gives the user eight possible choices. The user may select any of the three keys in the lessons window 42, any of the three keys in the reference window 44, the Application key 46 or the Resume key 47. The operation of the system in response to each of these selections is described in connection with FIG. 12.

After the options display 40 is generated at step 282, the program waits for the user's selection at step 284. At step 286, if the user selected the Lesson Menu key in order to select a lesson, the program branches to step 288 where it determines whether the user has previously selected a unit. The reason for checking whether a unit has been previously selected is that before a lesson can be conducted, both the lesson and the unit in which the lesson is contained must be specified by the user. If a unit was previously selected as determined at step 288, the program branches back to step 262 (FIG. 11) where the program generates the lesson selection display 54 (FIG. 3b) to allow the user to select a lesson as described above.

If no unit has been selected by the user as determined at step 288, the program generates a visual message 290 to the user via the CRT 20 that the user must select a unit before a lesson can be selected.

If the Resume key was selected by the user as determined at step 292, the program branches to step 294 where it determines whether there is a lesson currently in progress. Since the purpose of the Resume key is to return the user to an interrupted lesson, at step 294 the system checks to make sure that there was a lesson in progress. If no lesson was in progress, the program branches to step 296 where the user is given a visual message on the CRT 20 that there is no lesson to resume. If a lesson was in progress as determined at step 294, the program branches back to step 272 where the lesson is resumed at the same point at which it was interrupted.

If the user selected the Unit Menu key as determined at step 298, the program branches to the LESSONS routine 250 where the unit selection display 50 of FIG. 3a will be generated. If the user selected the Topic Menu key as determined at step 300, the program branches to the TOPICS routine 320 where the topic index display 58 of FIG. 4a will be generated to allow the user to select a particular topic.

Figure 5A:
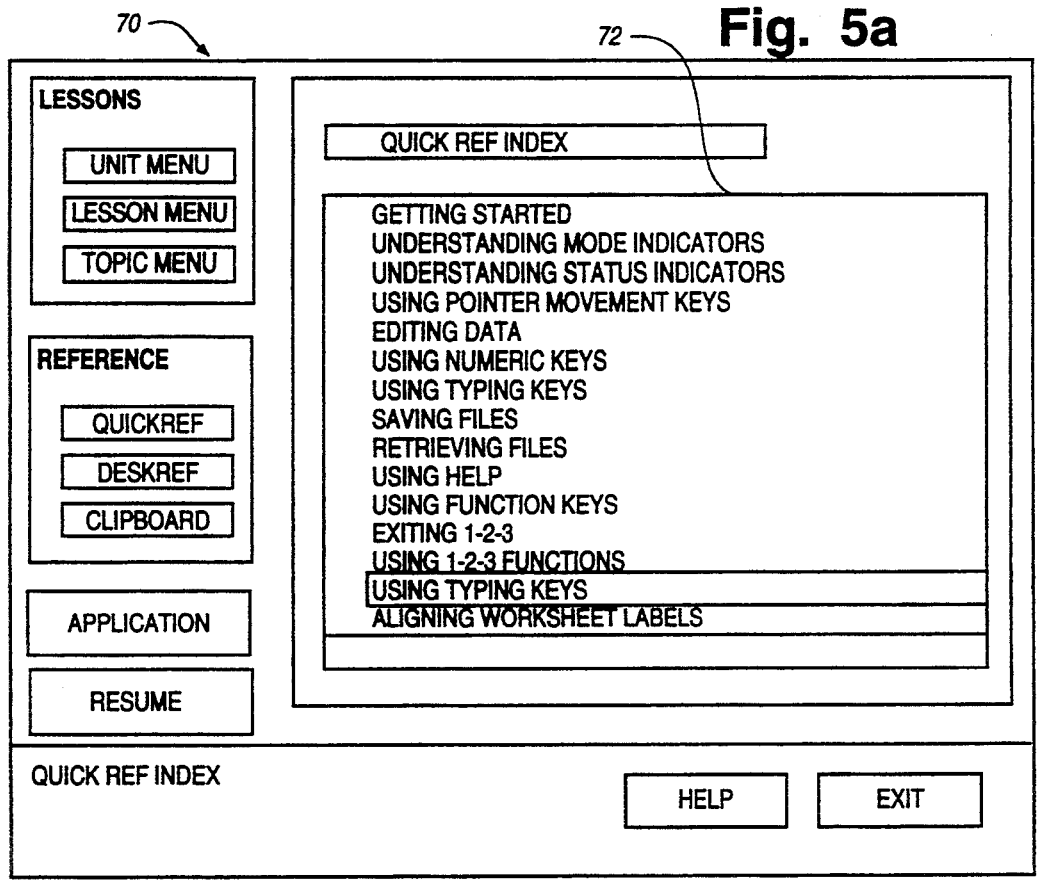
FIG. 5a is an illustration of a quick reference index display generated during operation of the learning system.

If the user selected QuickRef as determined at step 302, the program branches to the QUICKREF routine 370 where the quick reference index display 70 shown in FIG. 5a will be generated. If the user selected DeskRef as determined at step 304, the program branches to the DESKREF routine 420 where the desk reference index display 80 shown in FIG. 6a will be generated.

If the user selected the Clipboard key as determined at step 306, the program branches to the CLIPBOARD routine to allow the user to perform the clipboard functions. If the Clipboard key was not selected at step 306, the only remaining key on the options display 40 (excluding Help and Exit which are not treated in FIG. 12) is the Application key 46, and the program branches to the APPLICATION routine where the application program being taught is loaded and run.

TOPICS

Figure 13A:
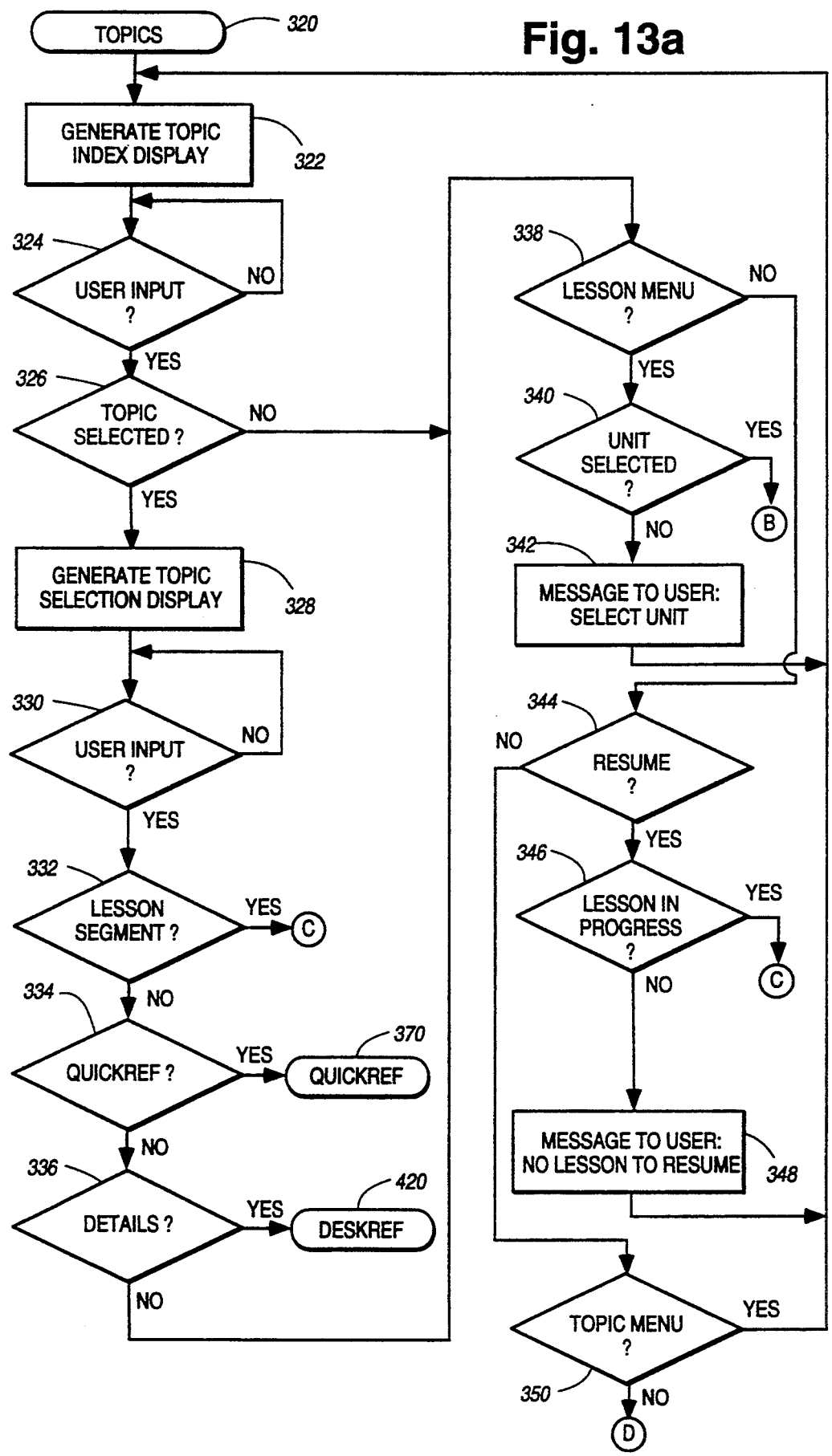
Figure 13B:
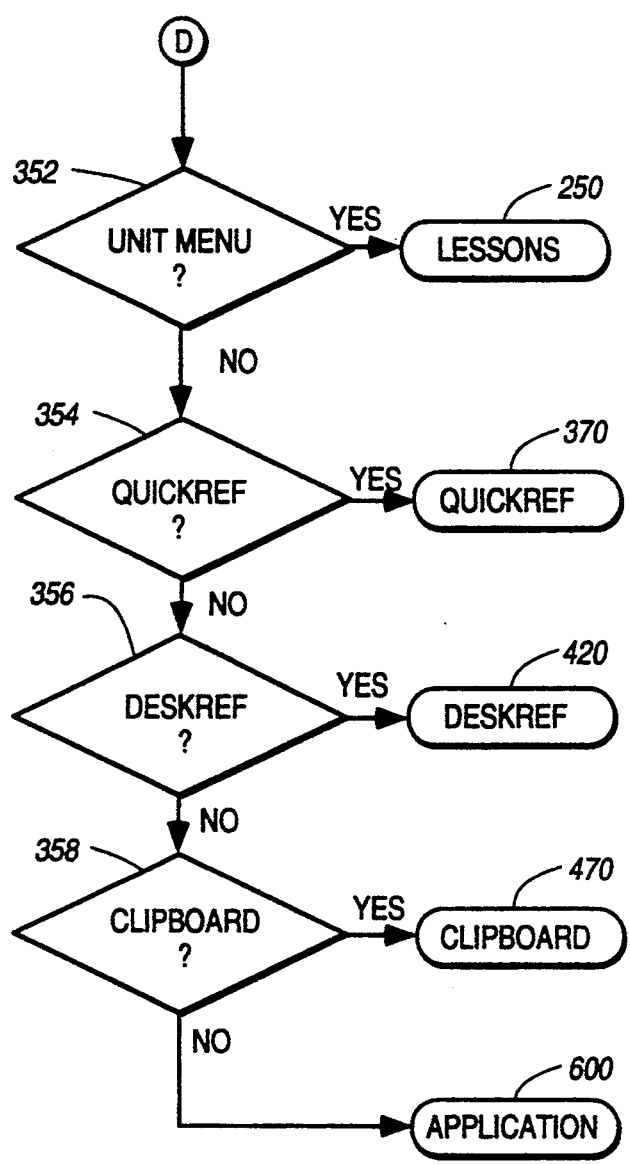

A flowchart of the TOPICS routine 320 is shown in FIGS. 13a and 13b. The TOPICS routine is performed either when the user selects the topic path via a path selection display 114 shown in FIG. 8 or when the user selects the Topic Menu key on any of the displays shown in FIGS. 2 and 4–7. The basic function of the TOPICS routine is to provide a list of relatively narrow topics upon which information or instruction is available and to allow the user to select the information or instruction that is desired for any of the topics available.

Referring to FIG. 13a, the TOPICS routine begins execution at step 322 where the topic index display 58 (FIG. 4a) is displayed on the CRT 20. At step 324, the program then waits for the user to select one of the listed topics or one of the eight other option keys at the left-hand portion of the display 58.

If a topic was selected by the user as determined at step 326, the program branches to step 328 where the topic selection display 64 (FIG. 4b) is generated to allow the user to select either textual reference information or lessons for the selected topic. If the user selects the Lesson Segment key as determined at step 332, the program branches to step 272 (FIG. 11) where a lesson segment is conducted on the selected topic. If the user selects the QuickRef and Examples key as determined at step 334, the program branches to the QUICKREF routine 370. If the user selects the Details key as determined at step 336, the program branches to the DESKREF routine 420.

If the user did not select a topic as determined at step 326, or if the user did not select one of the three options in the main window 66 of the topic selection display 64 (FIG. 4b), the user must have selected one of the eight option keys shown in the left-hand portion of the displays 58, 64. These options are Unit Menu, Lesson Menu, Topic Menu, QuickRef, DeskRef, Clipboard, Application, and Resume. If any one of these keys was selected, the program branches to step 338.

Steps 338–358 shown in FIGS. 13a and 13b determine which one of these keys was chosen and cause the appropriate action to be taken. Steps 338–358 are similar to steps 286–306 of FIG. 12, and thus the description of those steps is not repeated.

QUICKREF

Figure 14:
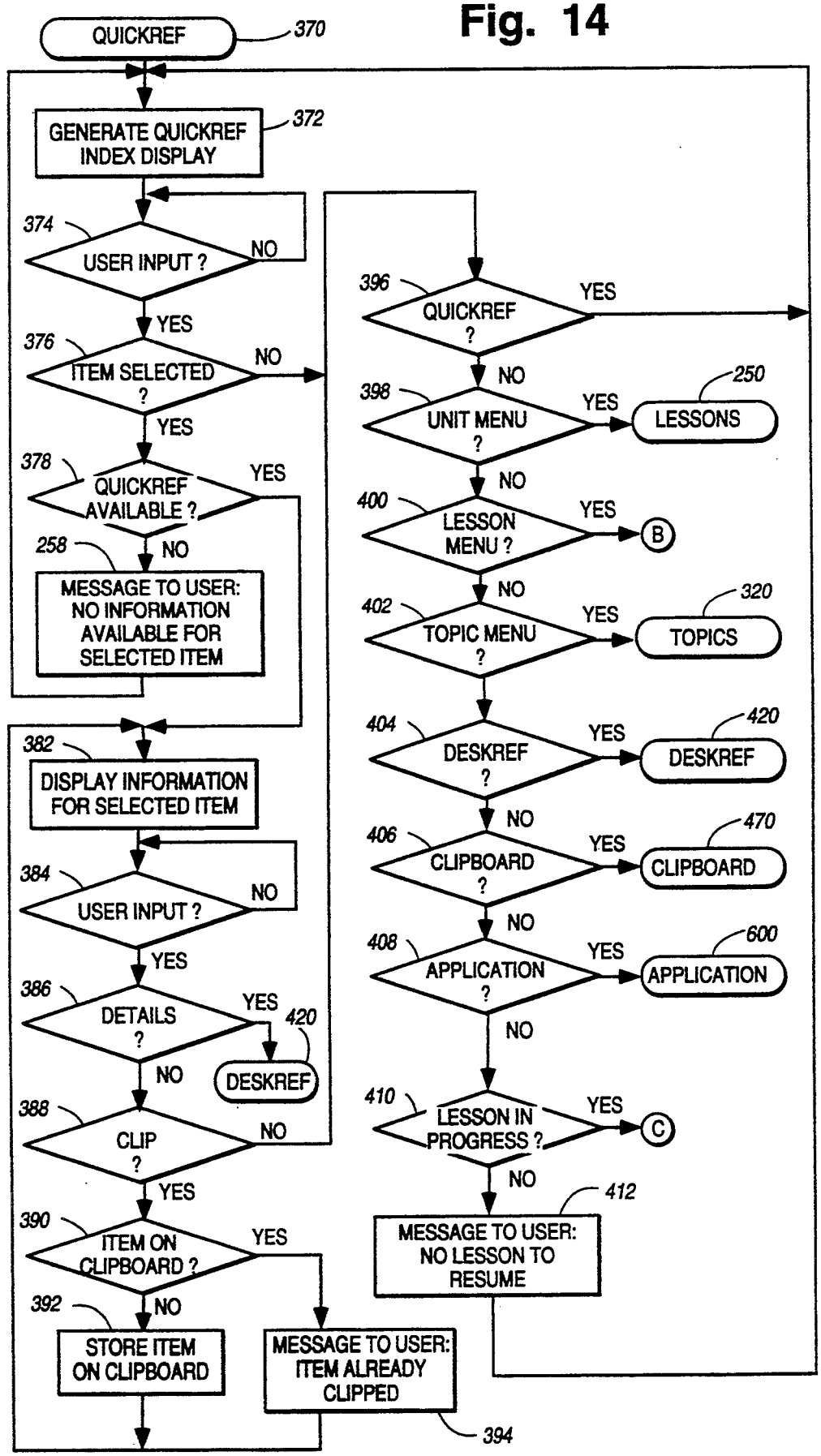

A flowchart of the QUICKREF routine 370 is shown in FIG. 14. The QUICKREF routine is used to allow the user to obtain relatively brief textual reference information about any one of a number of subject matter areas.

Referring to FIG. 14, the QUICKREF routine begins execution at step 372 where the quick reference index display 70 (FIG. 5a) is generated on the CRT 20. At step 374, the program then waits for the user to select a particular subject matter area for which brief textual information may be available, or to select one of the eight options shown in the left-hand portion of the quick reference index display 70.

If the user selected a particular subject matter area, or item, for which textual information is desired as determined at step 376, the program branches to step 378 where it determines whether textual information is available for the selected item. This step is necessary since quick reference information may not be provided for all items. If the information is not available for the selected item as determined at step 378, the program branches to step 380 where the program generates a visual message to the user via the CRT 20 that no textual information is available for the selected item.

Figure 5B:
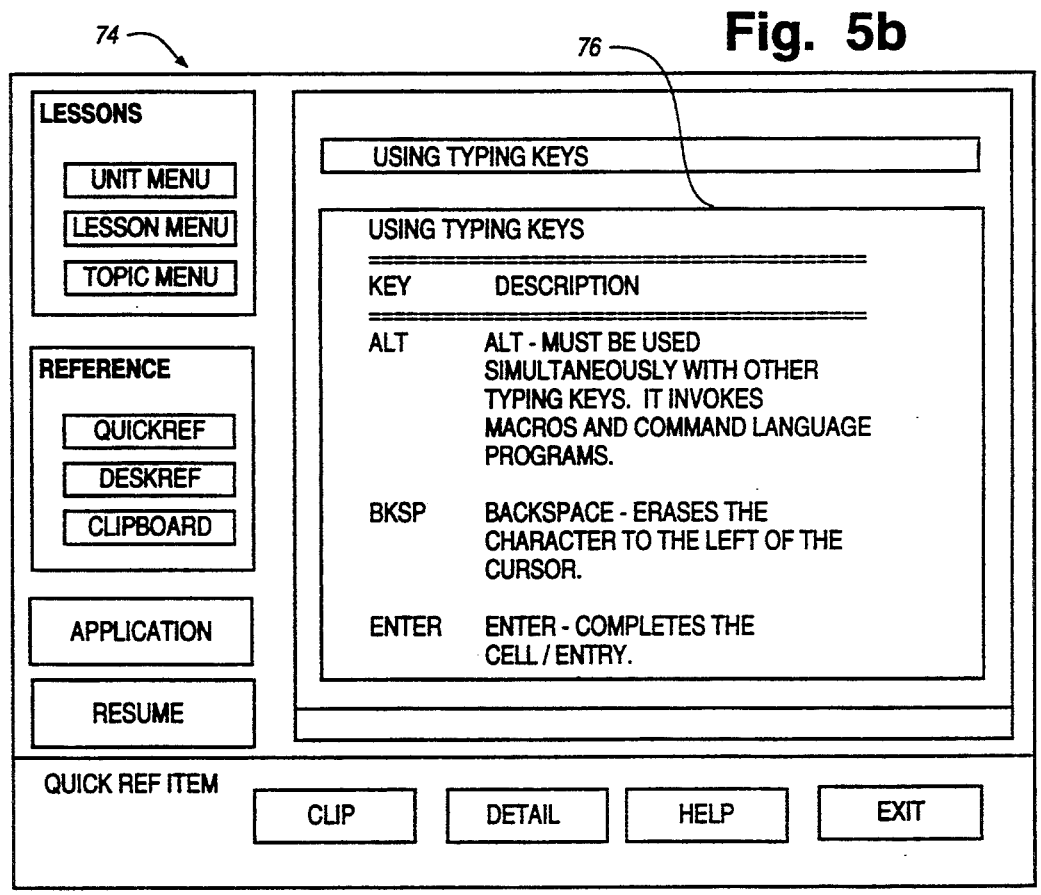
FIG. 5b is an illustration of a quick reference item display generated during operation of the system.

If textual information for the selected item is available as determined at step 378, the program branches to step 382 where the information is displayed via the generation of the quick reference item display 74 like the one shown in FIG. 5b.

After the system generates the display 74, the user may select a Clip key or a Detail key shown at the bottom of the display 74 (FIG. 5b), or the user may select one of the eight standard options shown on the left-hand portion of the display 74.

If the user selects the Detail key as determined at step 386, the program branches to the DESKREF routine 420 from which the user may select detailed textual information for the selected item.

The user may also decide to "clip" or store portions of the displayed textual information on the clipboard diskette. The desired information may be selected by the user for clipping in a conventional manner such as by highlighting the desired portion via a keyboard key such as the Tab key, and then pressing the Enter key.

If the user selects the Clip key as determined at step 388, the program branches to step 390 where it will determine if that same information has already been stored on the clipboard. If it has been previously stored, at step 394 the program will generate a visual message to the user that the selected item was already clipped. If the item was not already clipped, the program branches to step 392 where it stores the item on the clipboard diskette in the disk drive 24.

If the user did not select either the Detail or Clip key after the generation of the quick reference information display 74, the program branches from step 388 to step 396. Step 396 is also performed if the user did not select an item as determined at step 376.

In either case, the user selected one of the eight standard options shown on the left-hand portion of the displays 70, 74. The purpose of steps 396–412 is determine which option was selected and to take appropriate action in each case.

If the QuickRef key was selected as determined at step 396, the program simply returns back to step 372 of the QUICKREF routine 370. If the Unit Menu key was selected as determined at step 398, the program branches back to the LESSONS routine 250 in which case the program will generate the unit selection display 50 (FIG. 3a). If the Lesson Menu key was selected as determined at step 400, the program branches back to step 262 where the lesson selection display will be generated.

Steps 402–408 determine, respectively, whether the Topic Menu, DeskRef, Clipboard or Application keys were selected and cause the program to branch to the corresponding routine. If the program reaches step 410, meaning that the user selected the Resume key, it determines whether there was a lesson in progress, and either resumes the lesson by branching back to step 272 or generates a message to the user at step 412 that there is no lesson to resume.

DESKREF

Figure 15:
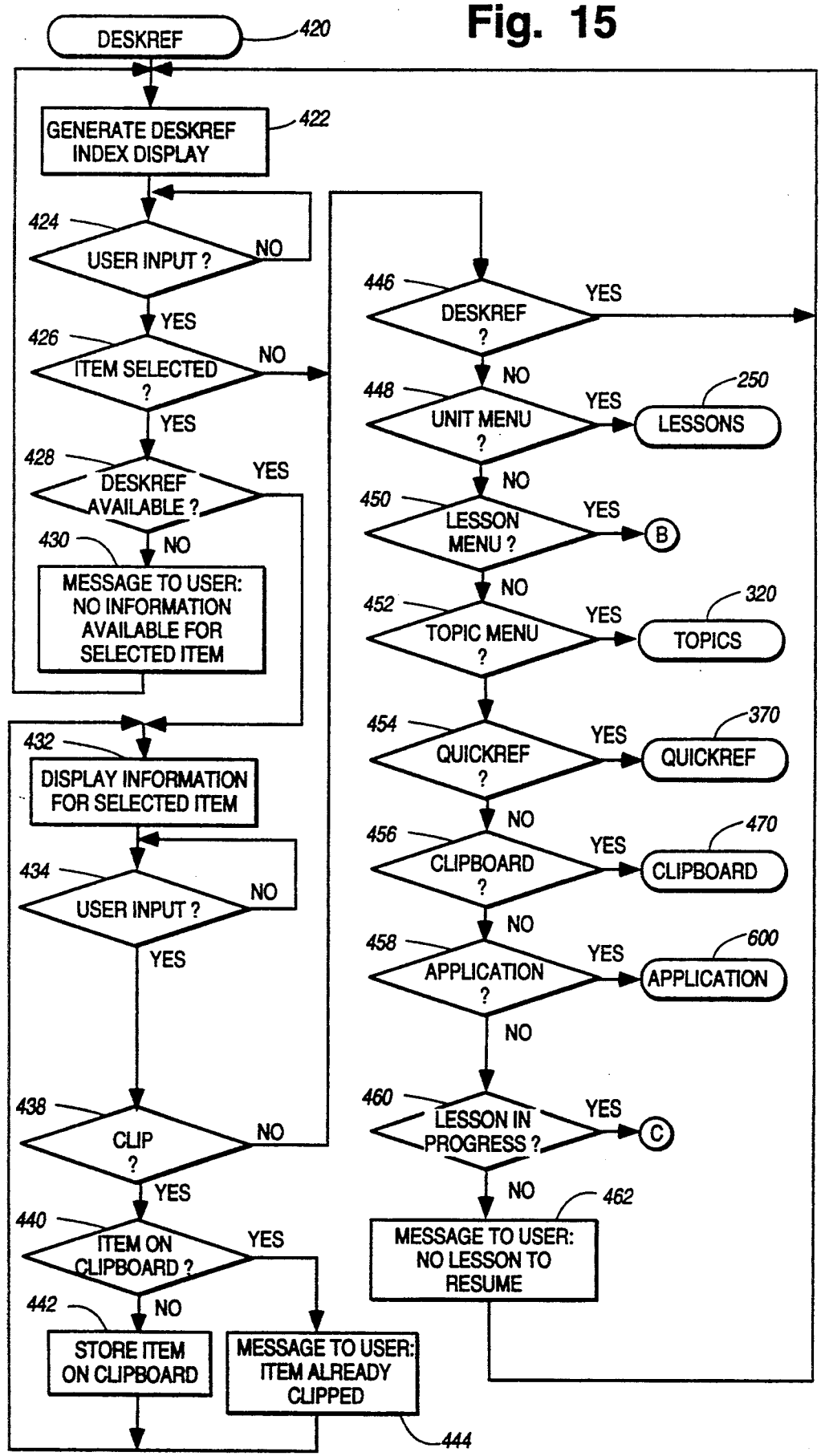

A flowchart of the DESKREF routine 420 is shown in FIG. 15. The DESKREF routine is used to allow the user to obtain detailed textual reference information about any one of a number of subject matter areas. The operation of the DESKREF routine is very similar to the operation of the QUICKREF routine described above in connection with FIG. 14. Accordingly, only the differences between the two routines are described.

Figure 6A:
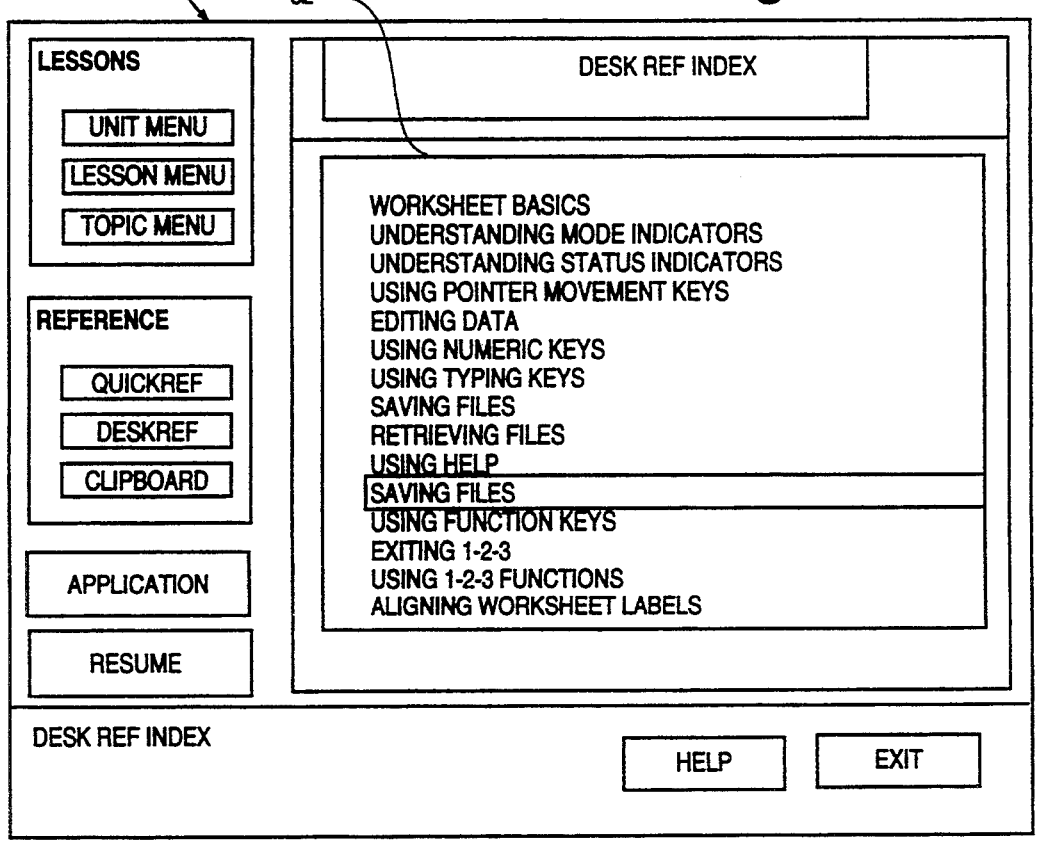
FIG. 6a is an illustration of a desk reference index display generated during operation of the system.
Figure 6B:
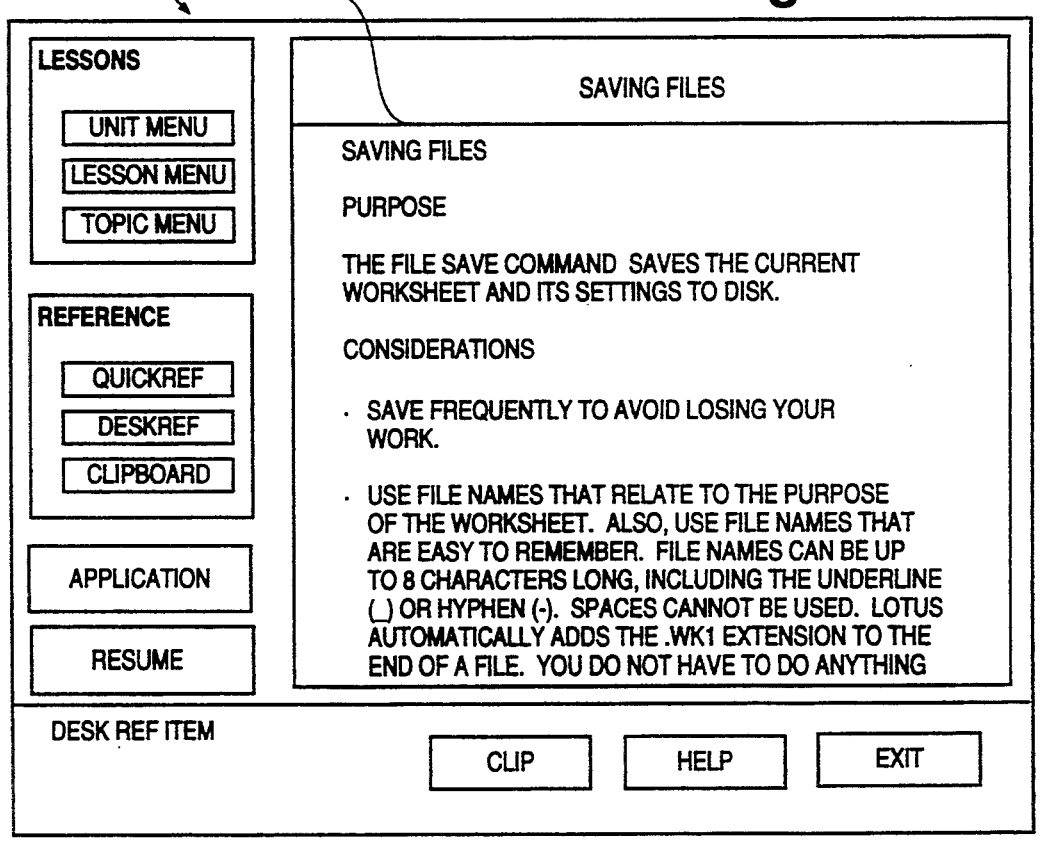
FIG. 6b is an illustration of a desk reference item display generated during operation of the system.

At step 422, the DESKREF routine generates the desk reference index display 80 like the one shown in FIG. 6a. At step 428, the program determines whether detailed reference information is available, instead of whether brief reference information is available. At step 432, the DESKREF routine generates detailed reference information for the selected item, such as that shown in the display 86 of FIG. 6b. Finally, the DESKREF routine does not have a step corresponding to the step 386 in the QUICKREF routine since the information on the desk reference display 86 is already detailed and no further detail is available.

CLIPBOARD

Figure 16:
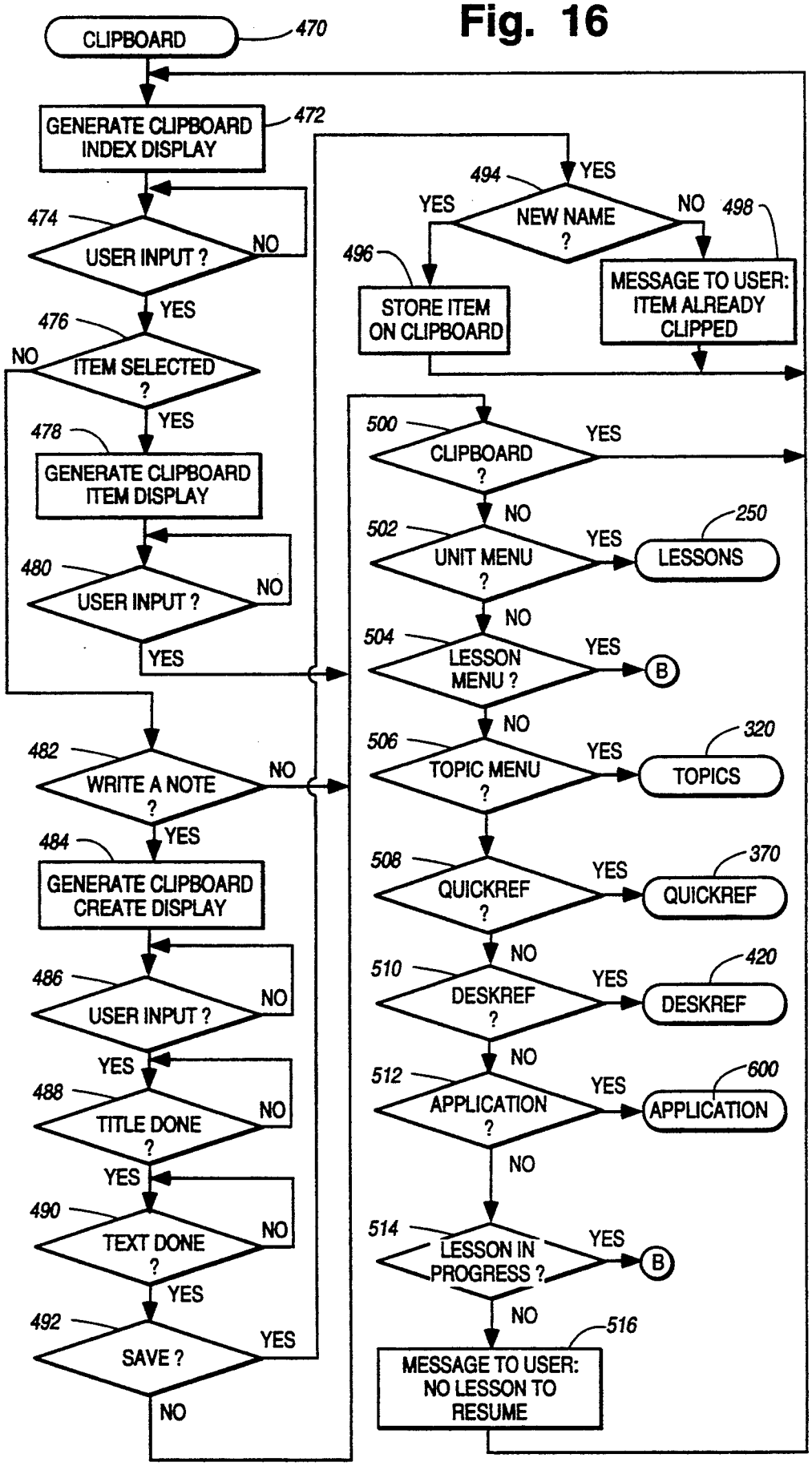

A flowchart of the CLIPBOARD routine 470 is shown in FIG. 16. The CLIPBOARD routine is used to allow the user to write notes regarding various aspects of the application program to the clipboard diskette and to retrieve from the clipboard diskette any textual reference information about the application program that has been previously stored on it.

User-selected portions of reference information generated by the QUICKREF and DESKREF routines can also stored on the clipboard; however, as described above, this is accomplished during those QUICKREF and DESKREF routines and not during the CLIPBOARD routine.

Referring to FIG. 16, at step 472 the CLIPBOARD routine generates the clipboard index display 90 shown in FIG. 7a. This display contains in a main window 92 the titles of all items currently on the clipboard diskette. At step 474, the program waits for the user to select an option. The user may select one of the displayed items or write a customized note to the clipboard diskette by selecting the Write A Note key shown in the bottom portion of the display 90 (FIG. 7a). Alternatively, the user may select any one of the eight standard options shown in the left-hand portion of the display 90.

Figure 7B:
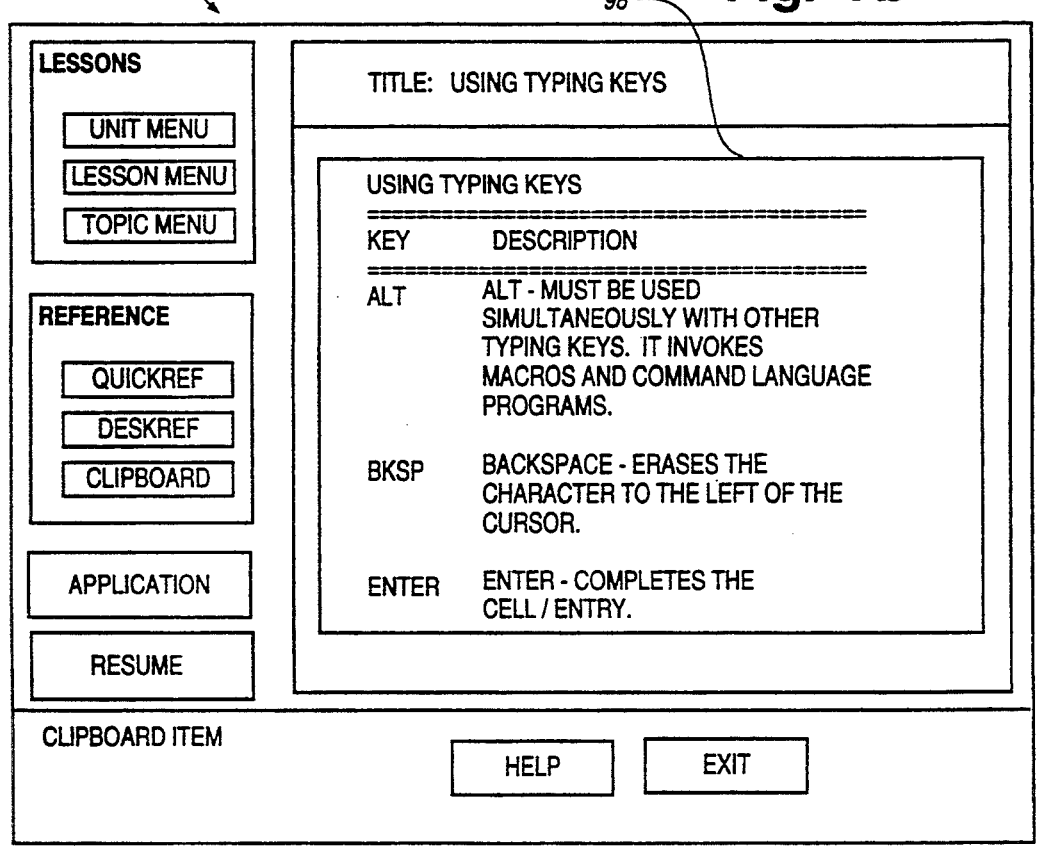
FIG. 7b is an illustration of a clipboard item display generated during operation of the system.
Figure 7C:
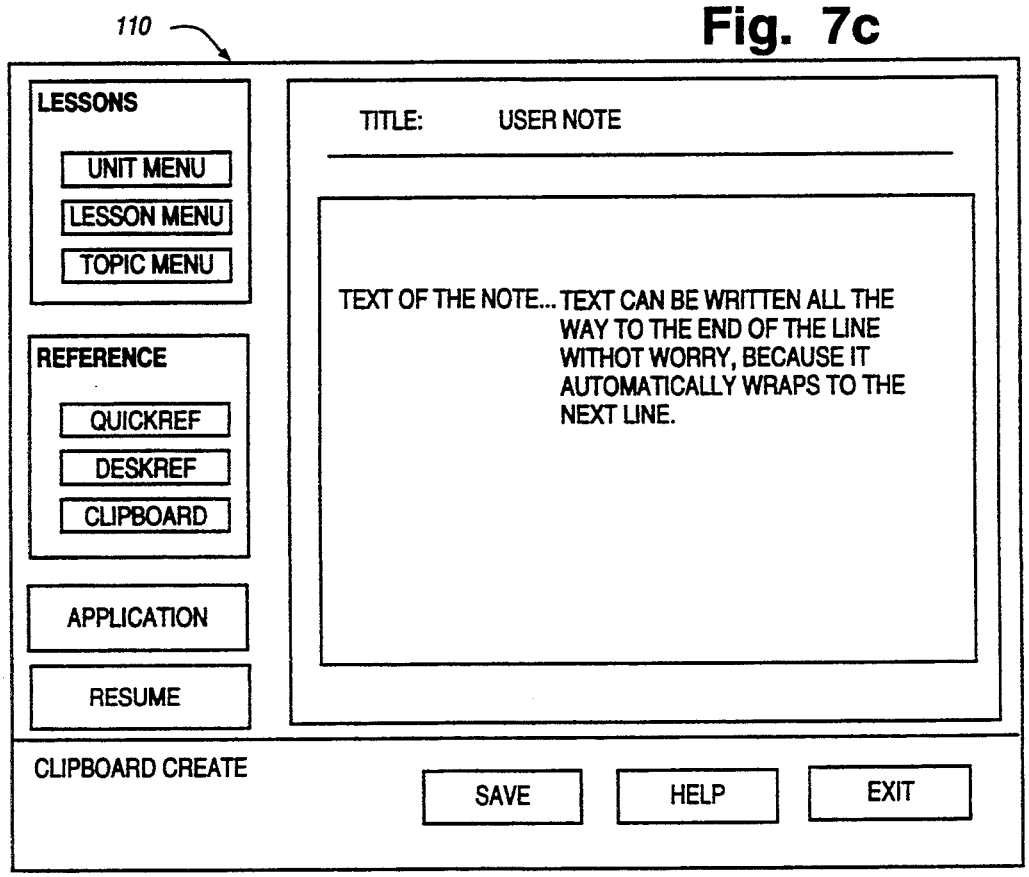
FIG. 7c is an illustration of a clipboard create display generated during operation of the system.
Figure 8:
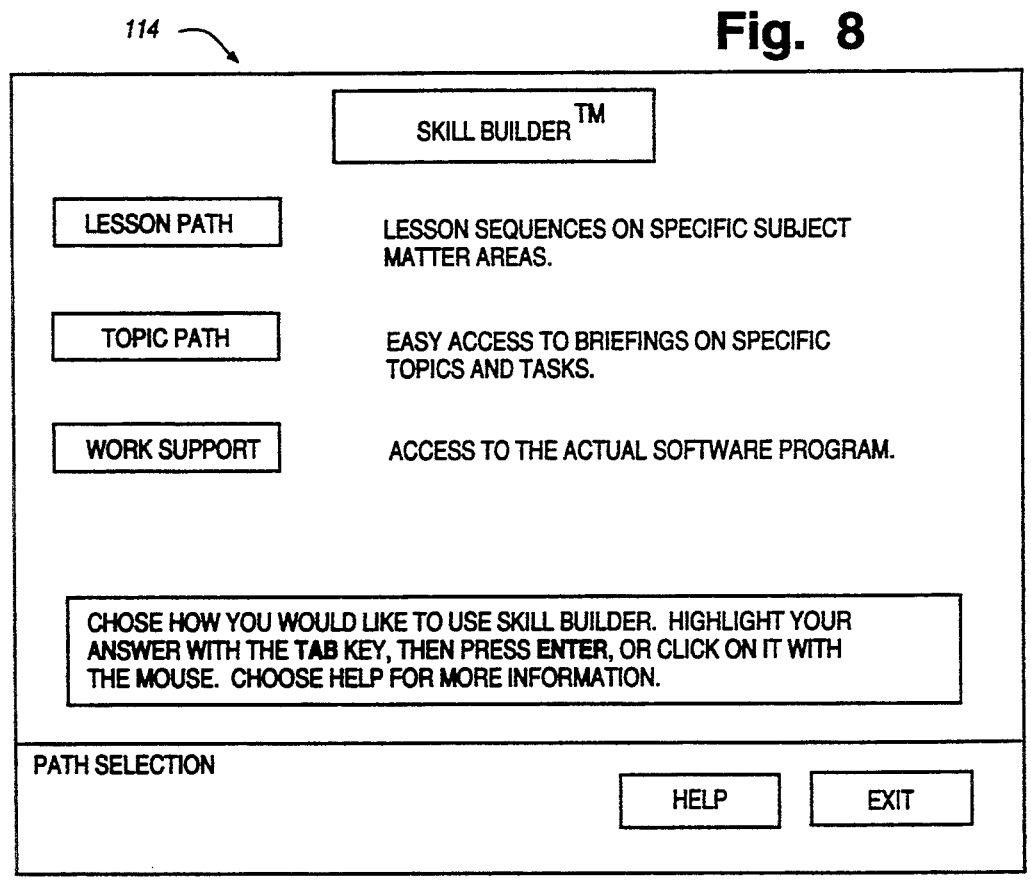
FIG. 8 is an illustration of a path selection display generated during operation of the system.

If the user selected one of the items on the clipboard as determined at step 476, the program branches to step 478 where it generates the clipboard item display 96 as shown in FIG. 7b. The textual matter contained in the selected clipboard item is displayed in the main window 98 of the display 96. After generating the display of the text of the selected clipboard item, the program waits at step 480 for the user to select an option, which in this case may be any of the eight standard options.

If the user did not select an item from the clipboard to be displayed as determined at step 476, the program branches to step 482, where the program determines if the user selected the Write A Note key. If so, the program branches to step 484 where it generates the clipboard create display 110 shown in FIG. 7c and waits for user input at step 486.

The user creates a customized note by first selecting a title at step 488 and then at step 490 generating the text that is to be stored on the clipboard diskette for that title. At step 492, if the user is satisfied with the title and text of the customized note, the user may save it to the clipboard.

If the user saves the note, the program automatically checks to determine whether the name of the title has been used for a previously stored clipboard item. If the title has a unique name, the program branches to step 496 where it saves the item on the clipboard diskette. If an item having the same title has previously been stored on the clipboard diskette, the program branches to step 498 where it generates a message to the user that the item has already been clipped.

Since steps 500–516 of the CLIPBOARD routine 470 are analogous to steps 396–412 of the QUICKREF routine described above in connection with FIG. 14, the description of those steps is not repeated.

APPLICATION

The APPLICATION routine 600, which is a part of the interactive learning computer program of the preferred embodiment described herein, is the functional link between the learning program and the application program being learned. The APPLICATION routine performs a number of functions, such as automatically loading and running the application program without requiring the user to manually exit the learning program and manually initiate the application program.

The APPLICATION routine 600 also automatically loads a terminate-but-stay-resident (TSR) computer program that allows the user to access reference information available from the learning computer program of the present invention while using the application program, without requiring the user to exit the application program and run the learning program.

A third function performed by the APPLICATION routine 600 is to automatically pass information relating to a unit of lessons that has been completed from the learning program to the application program when the application program is invoked by the user. As a result, when the learning program automatically loads and runs the application program, preselected files relating to lessons completed by the user are automatically loaded in the application.

For example, if a user just completed a unit of lessons relating to the use of columns in the WordPerfect application program, the APPLICATION routine 600 would first load WordPerfect and then automatically load a preselected document having multiple columns so that the user could practice the word-processing functions relating to columns upon which instruction was just received from the learning program.

Each unit of lessons has a unique electronic file associated therewith that is automatically loaded into the application program to allow the user to practice the particular features of the application program upon which he or she has received instruction.

Figure 17:
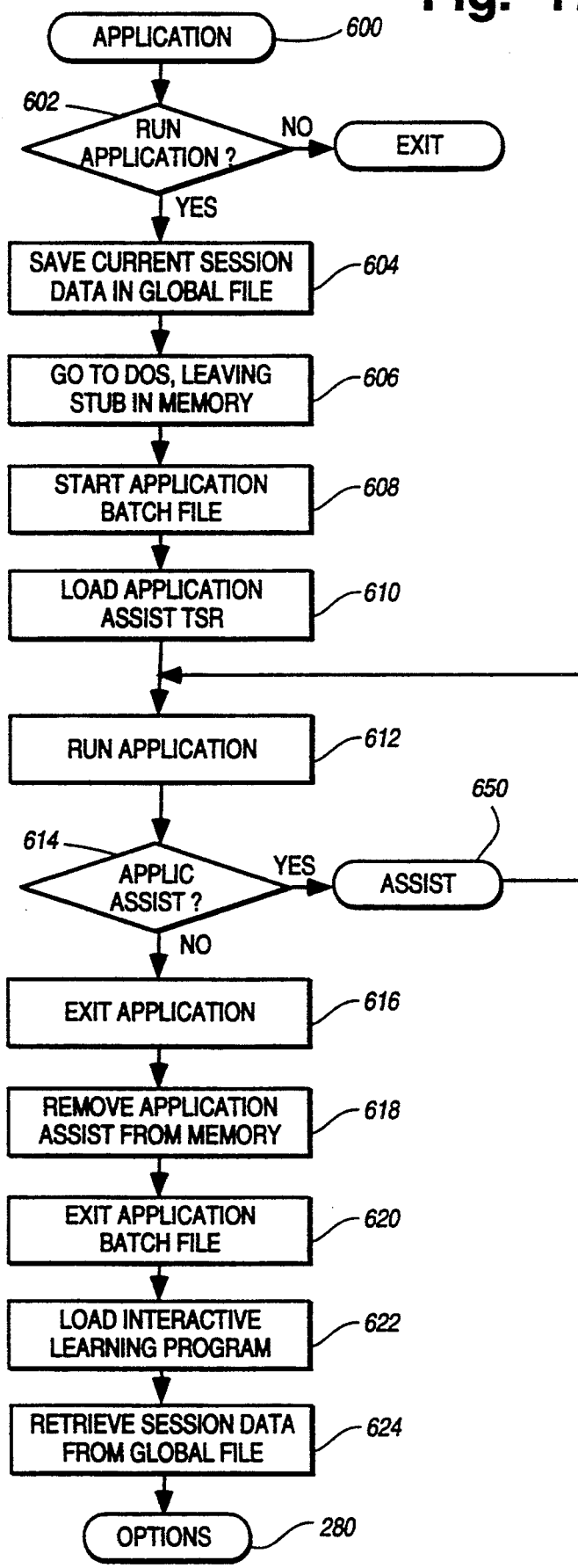

Now referring to FIG. 17, the operation of the APPLICATION routine is described in detail. Generally, the APPLICATION routine is invoked when the user selects the work support learning path (see FIG. 8) or when the user selects the Application key 46 provided in any of the displays shown in FIGS. 2 and 4–7.

At step 602, the program generates a visual prompt to the user via the CRT 20 confirming that the user wishes to run the application program. If the user mistakenly selected the Application key or has changed his or her mind and indicates such by an appropriate keyboard entry, the APPLICATION routine simply exits, and returns to the point from which the user invoked it.

At step 604, the program stores data relating to the learning session from which the user has just terminated. This data includes the user's name and sign-on and data relating to the lessons that the user has completed. The data is stored in a global file so that it can be retrieved when the user exits from the application program to go back to using the learning program.

At step 606, most of the learning program is removed from the RAM 16 to make room for the application program, which will be stored in the RAM 16 and executed, and the operating system takes control. If a personal computer is being used, the operating system may be the DOS program of Microsoft, Inc. Although most of the learning program is removed from the RAM 16, a portion of it known as a "stub" is left in the RAM 16. A stub is a conventional type of computer program used to perform various "housekeeping" functions. One of the purposes of the stub in this case is to automatically reload the learning program when the user exits the application program, so that the user does not have to reload the learning program manually.

At step 608, an application batch file is started. Batch files, which are conventional and well-known, are very short computer programs, e.g. several lines of source code, which may perform any functions. In this case, the batch file consists basically of three program statements, a first statement which causes the TSR program to be run, a second statement which causes the application program to be run, and a third statement which causes the TSR program to be removed from the RAM 16 when the user decides to terminate use of the application program.

The batch file may also include an electronic file for use in the application program. As described generally above, if the user has entered the APPLICATION routine after completing a unit of lessons, the electronic file relates to the unit of lessons that has been completed. Thus, if there are eight possible units of lessons in the learning program, there would be eight unique electronic files that would be loaded, depending upon which lesson unit the user completed. This feature may be implemented by having a separate batch file for each unit, or by having a single batch file having the capability to access one of eight unique electronic files.

The subsequent use of the application program for the unique electronic file that is automatically loaded may be supplemented by a printed text or manual for requesting the user to perform predetermined operations on the electronic file, such as requesting the user to perform specific manipulations of the columns of a spreadsheet in case the user was using Lotus 1-2-3 as the application program.

At step 610, the first statement in the batch file causes a self-loading application assist TSR program referred to generally above to be loaded into the RAM 16 and executed by the microprocessor 12. A TSR (terminate-but-stay-resident) program is a conventional type of computer program which may be accessed during the operation of another computer program. The TSR "stays in the background" during operation of the program, but comes into the foreground when invoked by the user. The application assist TSR used in connection with the preferred embodiment of the invention is shown in FIG. 18 and described below in connection therewith.

At step 612, the second statement in the batch file causes the application program to be loaded into the RAM 16 and executed by the microprocessor 12. When the application is running, it appears to the user exactly as it would if the user were using the application program without the system of the present invention.

Figure 18:
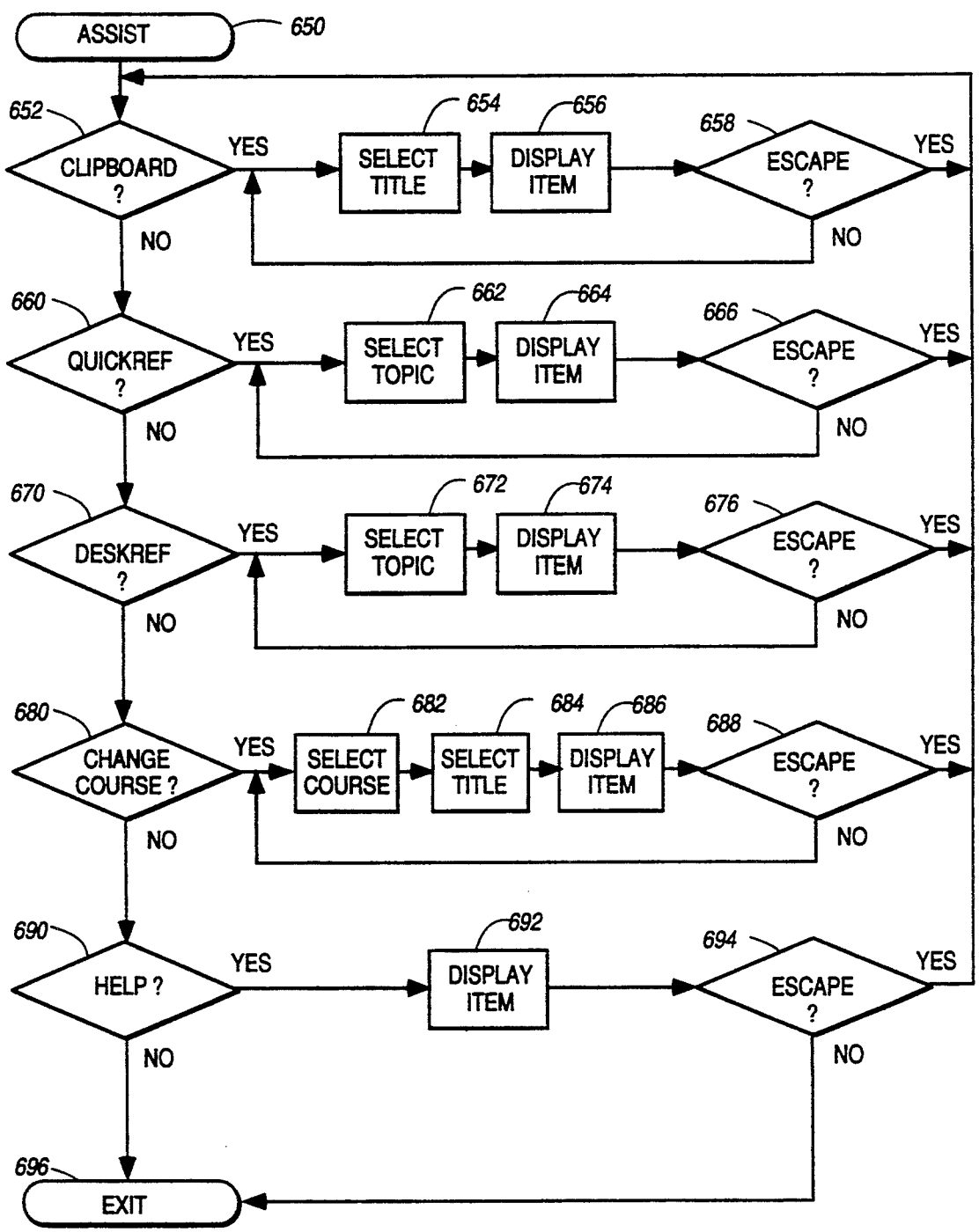

However, if the user wishes to access any of the information provided by the learning system of the invention, the user simply selects a particular key combination (control-shift H) to invoke the ASSIST routine 650 of FIG. 18, which allows the user to access previously generated clipboard information, brief reference information or detailed reference information about the application program. When the user is finished using the reference information, he or she can exit the routine by making a keyboard entry (Exit).

When the user is finished using the application program, the user exits the application program at step 616, and at step 618 the third statement in the batch file described above causes the application assist TSR program to be removed from the RAM 16. At step 620, the application batch file terminates, returning control to the stub program that remained in the RAM 16. At step 622, the stub program causes the interactive learning program of the invention to be automatically loaded back into the RAM 16 without the need for the user to manually start the learning program. At step 624, the session file data that was previously stored in the global file at step 604 is retrieved. The program then branches to the OPTIONS routine 280, which causes the options display to be generated on the CRT 20 so that the user can decide how to continue.

ASSIST

As described above, when using the application program, the user may access reference information from the learning system via the assist TSR, or ASSIST routine 650. When invoked by the user, the ASSIST routine generates an assist display (not shown) on the CRT 20 that overlaps the display generated by the application program. The assist display includes six of the option keys described above: Clipboard, QuickRef, DeskRef, Change Course, Help and Exit.

The user may select any of these options to obtain access to the corresponding type of information. The selected information is displayed on the CRT 20 and also overlaps the display generated by the application program. When the user exits from the assist feature, the assist displays disappear from the CRT 20 and the application program displays reappear. Thus, unless the assist feature is being used, it stays in the "background" and is "invisible" to the user.

A flowchart of the ASSIST routine 650 is shown in FIG. 18. If the user selected the Clipboard key as determined at step 652, the program branches to step 654 where it generates a clipboard index display 90 like the one shown in FIG. 7a that lists the titles of all of the clipboard items. After the user selects one of the titles, the program branches to step 656 where the clipboard information corresponding to that title is display in a clipboard item display like the one shown in FIG. 7b. The user can repeatedly access the clipboard feature or exit from it by making an appropriate keyboard entry such as the Esc key.

If the user selected the QuickRef key as determined at step 660, the program branches to step 662 where it generates a select topic display like the one shown in FIG. 5a. After the user selects a topic, the program generates the reference information corresponding to that topic. The user may exit at step 666. Steps 670–676 are analogous to step 660–666 described above, except that detailed reference information is provided to the user instead of brief reference information.

The user may obtain clipboard information about an application program other than the one currently being run by the user via the Change Course key. If the user selected the Change Course key as determined at step 680, the program branches to step 682 where it prompts the user to select the desired course, such as to LOTUS 1-2-3, WORDPERFECT, dBASE III, etc. After the user selects the course, the program generates at step 684 a clipboard index display like the one of FIG. 7*a* to list the titles of all clipboard items. Upon the user selecting one of those clipboard items, at step 686 the program generates a display like the one of FIG. 7*b* showing the selected clipboard item.

Steps 690–694 allow the user to request help to obtain instruction relating to the application assist feature. The user may exit the application assist feature at step 696, at which point the application assist display disappears from the CRT 20 and the application display that was covered up reappears.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An interactive learning system for providing lessons relating to an application program to be learned by a user, said system allowing the user to access a secondary source of instruction for the application program during the execution of one of said lessons, said system comprising:

a programmable processor wherein said processor includes:

first control means for providing a first type of instruction relating to the application program being learned by the user, said first type of instructions comprising lessons that substantially simulate the actual operation of the application program and second control means for providing a second type of instruction relating to the application program;

a display coupled to said processor for displaying a first visual display sequence relating to said first type of instruction and a second visual display relating to said second type of instruction wherein said processor further includes, means, coupled to said first and second control means, for temporarily suspending said first visual display sequence at an interruption point in order to display said second visual display and means, coupled to said first and second control means, for causing said first visual display sequence to be resumed from said interruption point after said second visual display has been displayed; and manually operable means, coupled to said processor, for specifying a user assisting function and wherein said processor is responsive thereto for initiating a selected function.

* * * * *